(12) United States Patent
Walker et al.

(10) Patent No.: US 7,194,423 B2
(45) Date of Patent: *Mar. 20, 2007

(54) METHOD AND APPARATUS FOR DETERMINING A PROGRESSIVE DISCOUNT FOR A CUSTOMER BASED ON THE FREQUENCY OF THE CUSTOMER'S TRANSACTIONS

(75) Inventors: Jay S. Walker, Ridgefield, CT (US); Andrew S. Van Luchene, New York, NY (US); Magdalena Mik, Norwalk, CT (US); Dean P. Alderucci, Stamford, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/728,226

(22) Filed: Dec. 4, 2003

(65) Prior Publication Data

US 2004/0117261 A1 Jun. 17, 2004

Related U.S. Application Data

(63) Continuation of application No. 09/166,267, filed on Oct. 5, 1998, now Pat. No. 6,687,679, which is a continuation-in-part of application No. 09/049,297, filed on Mar. 27, 1998.

(51) Int. Cl.
*G06F 17/60* (2006.01)

(52) U.S. Cl. .......................... 705/14; 705/14; 705/16; 705/26; 705/27; 705/41; 235/375; 235/380

(58) Field of Classification Search ................ 705/14, 705/26, 27, 16, 41; 235/375, 380
See application file for complete search history.

(56) References Cited

U.S. PATENT DOCUMENTS

| | | | |
|---|---|---|---|
| 4,373,727 A | 2/1983 | Hooker et al. | 273/143 R |
| 4,473,022 A | 9/1984 | Eastland | 273/999.999 |
| 4,567,609 A | 1/1986 | Metcalf | 382/9 |
| 4,603,390 A | 7/1986 | Mehdipour et al. | 364/467 |
| 4,817,166 A | 3/1989 | Gonzalez et al. | 382/1 |

(Continued)

FOREIGN PATENT DOCUMENTS

EP 0 025 754 B1 6/1983

(Continued)

OTHER PUBLICATIONS

Bagot, Brian, "Brand Report: Service, Please", Marketing & Media Decisions, Aug. 1990, pp. 79-83, ISSN: 0195-4296.

(Continued)

*Primary Examiner*—Bradley B. Bayat
(74) *Attorney, Agent, or Firm*—Michael D. Downs

(57) ABSTRACT

A system and method are disclosed for determining and applying a discount to a customer's transaction. The discount is of a progressive nature, wherein the value of a customer's discount increases if the customer meets the conditions associated with the discount. The system rewards more frequent or profitable customers with benefits such as larger increases in the discount or higher maximum discount than those awarded to less frequent or profitable customers. The discount is decreased or eliminated if the customer fails to meet the conditions associated with the discount.

8 Claims, 25 Drawing Sheets

U.S. PATENT DOCUMENTS

| | | | | |
|---|---|---|---|---|
| 4,878,248 | A | 10/1989 | Shyu et al. | 382/9 |
| 4,908,761 | A | 3/1990 | Tai | 364/401 |
| 4,922,435 | A | 5/1990 | Cahlander et al. | 364/513 |
| 4,963,723 | A | 10/1990 | Masada | 235/384 |
| 4,982,346 | A | 1/1991 | Girouard et al. | 364/550 |
| 5,034,739 | A | 7/1991 | Gruhl | 340/932.2 |
| 5,056,019 | A | 10/1991 | Schultz | 364/405 |
| 5,058,044 | A | 10/1991 | Stewart et al. | 364/999.999 |
| 5,081,685 | A | 1/1992 | Jones, III et al. | 382/1 |
| 5,136,658 | A | 8/1992 | Mori | 382/1 |
| 5,193,648 | A | 3/1993 | Yuter | 186/38 |
| 5,204,675 | A | 4/1993 | Sekine | 340/933 |
| 5,256,863 | A | 10/1993 | Ferguson et al. | 235/384 |
| 5,315,664 | A | 5/1994 | Kumagai | 382/1 |
| 5,325,291 | A | 6/1994 | Garrett et al. | 364/401 |
| 5,327,508 | A | 7/1994 | Deaton | 705/1 |
| 5,353,219 | A | 10/1994 | Mueller et al. | 364/405 |
| 5,380,991 | A * | 1/1995 | Valencia et al. | 235/383 |
| 5,381,155 | A | 1/1995 | Gerber | 342/104 |
| 5,388,165 | A | 2/1995 | Deaton | 705/1 |
| 5,422,473 | A | 6/1995 | Kamata | 235/384 |
| 5,425,108 | A | 6/1995 | Hwang et al. | 382/1 |
| 5,448,471 | A | 9/1995 | Deaton | 364/401 |
| 5,459,306 | A | 10/1995 | Stein | 235/383 |
| 5,482,139 | A | 1/1996 | Rivalto | 186/36 |
| 5,537,314 | A * | 7/1996 | Kanter | 705/14 |
| 5,568,406 | A | 10/1996 | Gerber | 364/562 |
| 5,591,972 | A | 1/1997 | Noble et al. | 250/330 |
| 5,604,901 | A | 2/1997 | Kelley et al. | 395/600 |
| 5,638,302 | A | 6/1997 | Gerber | 364/556 |
| 5,638,457 | A | 6/1997 | Deaton | 705/1 |
| 5,651,075 | A | 7/1997 | Frazier et al. | 382/105 |
| 5,666,493 | A | 9/1997 | Wojcik et al. | 395/222 |
| 5,687,322 | A * | 11/1997 | Deaton et al. | 705/14 |
| 5,689,100 | A | 11/1997 | Carrithers | 235/380 |
| 5,710,557 | A | 1/1998 | Schuette | 340/932.2 |
| 5,719,396 | A | 2/1998 | Jack et al. | 250/338.5 |
| 5,726,450 | A | 3/1998 | Peterson et al. | 250/338.5 |
| 5,737,710 | A | 4/1998 | Anthonyson | 701/1 |
| 5,745,052 | A | 4/1998 | Matsuyama | 340/932.2 |
| 5,774,870 | A * | 6/1998 | Storey | 705/14 |
| 5,806,045 | A * | 9/1998 | Biorge et al. | 705/14 |
| 5,832,457 | A | 11/1998 | O'Brien et al. | 705/14 |
| 5,842,178 | A | 11/1998 | Giovannoli | 705/26 |
| 5,842,212 | A | 11/1998 | Ballurio et al. | 707/100 |
| 5,903,874 | A * | 5/1999 | Leonard et al. | 705/14 |
| 5,938,717 | A | 8/1999 | Dunne et al. | 701/117 |
| 5,948,038 | A | 9/1999 | Daly et al. | 701/117 |
| 6,026,375 | A | 2/2000 | Hall et al. | 705/26 |
| 6,076,068 | A | 6/2000 | DeLapa et al. | 705/14 |
| 6,332,126 | B1 | 12/2001 | Peirce et al. | 705/14 |
| 6,415,261 | B1 | 7/2002 | Cybul et al. | 705/14 |

FOREIGN PATENT DOCUMENTS

| | | |
|---|---|---|
| WO | WO 96/21192 | 7/1996 |
| WO | WO 96/29668 | 9/1996 |

OTHER PUBLICATIONS

Ramirez, Anthony, "The Pizza Version of Dialing '911", The New York Times, Sep. 9, 1991, Section D, p. 1, Col. 3, Financial Desk.

O'Kane, Gerry, "Parking your car by computer", South China Morning Post, Mar. 23, 1993, Section: Supplement, p. 3.

Casper, Carol, "Restaurants seek loyal customers.", Direct, May 1994, Section: vol. 6, No. 5, p. 18, ISSN: 1046-4174.

"Food Lion Launches Frequent Shopper Plan", Supermarket News, Jan. 30, 1995, vol.; 45, No. 5, p. 17.

"Brazilian companies sell by affinity card", Insurance Industry International, Feb. 1995, No. 32, p. 6.

Rubel, Chad, "Young firm armed with technology fights an old giant; ETM to Ticketmaster: Let's rock", Marketing News TM, Jun. 19, 1995, p. 2.

"Stop & Shop Debuts Mastercard", Chain Store Age Executive Fax, Oct. 23, 1995, Section: No. 44, vol. 2.

Marriott, Anne, "A credit card deal—or not?; Co-branded cards' offers raise takers, debts", The Washington Times, Jul. 17, 1996, Section: Part B, Business, p. B7.

"Click this box for extra pepperoni; CyberSlice routes online orders", The Dallas Morning News, Dec. 2, 1996, Section: Business, p. 6D.

Cross, Richard et al., "The Customer Value Chain", Marketing Tools, Jan. 1997/Feb. 1997, Section: Database/Direct, p. 14.

Bradford, Stacey L., "Food Lion: King of the jungle?", Financial World, Jan. 21, 1997, Financial World, vol. 166, No. 1, p. 24, Coden: FIWOAR, ISSN: 0015-2064.

Purpura, Linda, "Green Hills Farms finding gold in frequent-shopper cards.", Supermarket News, Feb. 24, 1997, Section: No. 8, vol. 47, p. 19, ISSN: 0039-5803.

Gilligan, Gregory J., "Ukrop's Branches Into Finance . . . ", The Richmond Times Dispatch, Apr. 27, 1997, Section: Business, p. E-1.

Bowie, Liz, "Food Lion looks toward Baltimore . . . ", The Baltimore Sun, Apr. 28, 1997, Section: Business, p. 11C.

"Grocery shopping goes on line in many markets; Technology spurs remote ordering concept", The Dallas Morning News, May 12, 1997, Section: Business at p. 2D.

Stoneback, Diane, "It's In The Cards . . . ", The Morning Call, Jun. 18, 1997,. Section: A.M. Magazine, p. D1.

"A & P/Dominion Joins Air Miles (R) Reward Program", Canada Newswire, Aug. 21, 1997, Section: Financial News.

Popyk, Bob, "Turn customers into torchbearers", Information Access Company, a Thomson Corporation Company, National Trade Publications, Boating Industry, Sep. 1997, No. 9, vol. 60, p. 33, ISSN: 0006-5404.

Purpura, Linda, "The great equalizer: when it comes to customer-loyalty programs, quick reactions to incoming data give independent retailers a competitive advantage.", Supermarket News, Sep. 1, 1997, Section: No. 35, vol. 47, p. 17, ISSN: 0039-5803.

Appel, Ted, "Smart Coupons Save Big, Stores Track Spending With Discount Cards", The Press Democrat, Oct. 5, 1997, Section: p. E1.

Blackwell, Richard, "Get Club z points for shopping CIBC", The Financial Post, Oct. 9, 1997, Section: Section 1, News, p. 17, Company News.

Bird, Anat, "Super Community Banking: Sharpen Strategy to Keep Your Bank's Most Profitable Customers for Long Haul", The American Banker, Dec. 3, 1997, Section: Community Banking, p. 4.

"Here Come the Canadian Marketers", Credit Card Management, Jan. 1998, Section: Card Watch.

Heller, Al, "Chain Pharmacy: Forecast '98: New Technology Advances Pharmacy Productivity", Lebhar-Friedman Inc., Drug Store News, Jan. 12, 1998 at p. CP29.

Smith, Rebecca, "Buy More, Pay Less", Pittsburgh Post-Gazette, Jan. 19, 1998, Section: Business, p. E-1.

Website: "CIBC Club Z* VISA Card", (http//www cibc com/products/visa/VisaClubZ htm), download date: Feb. 1, 1998.

Website: "Club Z—Your Rewards On-Line", (http //www hbc com/clubz/default asp), download date: Feb. 1, 1998.

"Frequent Shopper Programs—Frequent Shopper Programs are Used by 14% of all Supermarkets", (http //www retailtech com/archive/frequent htm), download date: Feb. 1, 1998.

Website: "Turbocharging Your Customer-Loyalty Programs", (http //www retailtech com/archive/turbocha htm), download date: Feb. 1, 1998.

Rubinstein, Ed, "Internet Continues To Fortify Takeout Sector For Operators", Lebhar-Friedman Inc., Nation's Restaurant News, Mar. 23, 1998 at p. 55.

"Catching Red Light Runners", Business Communications Company, Advanced Transportation Technology News, Jun. 1998, vol. 5, No. 2.

Amato-McCoy, Deena, "Co-Branded Acme Credit Card Rewards Loyal Users", Information Access Company, A Thomson Corporation Company, Capital Cities Media Inc., Supermarket News, Jun. 15, 1998, p. 17, ISSN: 0039-5803.

"Acme Markets, U.S. Bancorp Debut Visa Rewards Card", Card News, Jun. 22, 1998, Section: vol. 13, No. 12.

"Garage management needs", "Unit Tracking with The General Manager Professional", (http www dacobusy com/garage/idxgarg htm), download date: Mar. 16, 1999.

"Welcome to Q Lube!", (http //www qlube com/), download date: Mar. 25, 1999.

Website: "Alphatech, Inc. Looking to the Futue", (http //www alphatech com/), download date: Mar. 25, 1999.

Website: "IMPS Vehicle License Plate Recognition System", (http //www Singapore com/optasia/imps), download date: Mar. 25, 1999.

"Examiner's Affidavit", Affidavit of USPTO Examiner James W. Myhre, Feb. 22, 2001.

* cited by examiner

| CUSTOMER IDENTIFIER 610 | NAME 615 | ADDRESS 620 | DISCOUNT 625 | CUSTOMER RATING 630 |
|---|---|---|---|---|
| 1234567 | JOE SMITH | 42 SILVER ST. TOWN, CT 55555 | 3.5% | A |
| 1234568 | JANE DOE | 1578 MAIN ST, CITY, CT 66666 | 0.5% | B |
| 1234569 | JOHN JONES | 183 BROAD ST. VILLAGE, CT 77777 | 1.0% | C |

| CUSTOMER IDENTIFIER 710 | NAME 715 | ADDRESS 720 | DISCOUNT 725 | DATE OF LAST TRANSACTION 730 |
|---|---|---|---|---|
| 1234567 | JOE SMITH | 42 SILVER ST. TOWN, CT 55555 | 3.5% | 1/25/98 |
| 1234568 | JANE DOE | 1578 MAIN ST. CITY, CT 66666 | 0.5% | 1/15/98 |
| 1234569 | JOHN JONES | 183 BROAD ST. VILLAGE, CT 77777 | 1.0% | 1/22/98 |

FIG. 7

| LICENSE PLATE CHARACTERS 810 | DISCOUNT 815 | DATE OF LAST TRANSACTION 820 | CUSTOMER RATING 825 |
|---|---|---|---|
| 111-AAA | 1.0% | 9/7/98 | B |
| 222-BBB | 2.8% | 9/10/98 | A |
| 333-CCC | 0% | 9/1/98 | C |

FIG. 8

| CUSTOMER RATING 910 | DISCOUNT INCREMENT 912 | TRANSACTION FREQUENCY 914 | TRANSACTION PRICE 916 |
|---|---|---|---|
| A | 0.5% | 1 / 2 WEEKS | $100.00 |
| B | 0.2% | 1 / 2 WEEKS | $75.00 |
| C | 0.1% | 1 / 2 WEEKS | $50.00 |

FIG. 9A

| CUSTOMER RATING 930 | MAXIMUM DISCOUNT 932 | TRANSACTION FREQUENCY 934 | TRANSACTION PRICE 936 |
|---|---|---|---|
| A | 15% | 1 / 2 WEEKS | $100.00 |
| B | 10% | 1 / 2 WEEKS | $75.00 |
| C | 5% | 1 / 2 WEEKS | $50.00 |

FIG. 9B

| CUSTOMER RATING 950 | GRACE PERIOD 952 | TRANSACTION FREQUENCY 954 | TRANSACTION PRICE 956 |
|---|---|---|---|
| A | 4 WEEKS | 1 / 2 WEEKS | $100.00 |
| B | 3 WEEKS | 1 / 2 WEEKS | $75.00 |
| C | 2 WEEKS | 1 / 2 WEEKS | $50.00 |

FIG. 9C

|  | CUSTOMER RATING 970 | DISCOUNT INCREMENT 972 | TRANSACTION FREQUENCY 974 | PRODUCT CATEGORY REQUIREMENTS 976 |
|---|---|---|---|---|
| 964 → | A | 0.5% | 1 / 2 WEEKS | 5 CATEGORY Z ITEMS / TRANSACTION |
| 966 → | B | 0.2% | 1 / 2 WEEKS | 3 CATEGORY G ITEMS / TRANSACTION |
| → | C | 0.1% | 1 / 2 WEEKS | 1 CATEGORY R ITEM / TRANSACTION |

|  | 1000 |  |  |
|---|---|---|---|
| TRANSACTION IDENTIFIER:985387 ||| 1010 |
| POS TERMINAL: 1118 ||| 1020 |
| CUSTOMER ID: 1234567 ||| 1030 |
| DATE: 01/18/98   TIME: 3:14 PM ||| 1040 |
| TRANSACTION PRICE: $103.87 ||| 1050 |
| PRODUCT IDENTIFIER 1070 | PRODUCT CATEGORY 1075 | PRODUCT PRICE 1080 | PRODUCT QUANTITY 1085 |
| 9876 | G | $25.50 | 2 |
| 6345 | R | $18.00 | 2 |
| 2009 | Z | $10.00 | 1 |

| CUSTOMER IDENTIFIER | NAME | ADDRESS | DISCOUNT | CUSTOMER RATING |
|---|---|---|---|---|
| 1234567 | JOE SMITH | 42 SILVER ST. TOWN, CT | 3.5% | A |

— 1402

1400B

| CUSTOMER RATING | DISCOUNT INCREMENT | TRANSACTION FREQUENCY | TRANSACTION PRICE |
|---|---|---|---|
| A | 0.5% | 1 / 2 WEEKS | $100.00 |

1400C

| TRANSACTION IDENTIFIER: 985387 | | | 1010 |
|---|---|---|---|
| POS TERMINAL: 118 | | | 1020 |
| CUSTOMER ID: 1234567 | | | 1030 |
| DATE: 01/18/98   TIME: 3:14 PM | | | 1040 |
| TRANSACTION PRICE: $103.87 | | | 1050 |
| PRODUCT IDENTIFIER 1070 | PRODUCT CATEGORY 1075 | PRODUCT PRICE 1080 | PRODUCT QUANTITY 1085 |
| 9876 | G | $25.50 | 2 |
| 6345 | R | $18.00 | 2 |
| 2009 | Z | $10.00 | 1 |

1400D

| CUSTOMER IDENTIFIER | NAME | ADDRESS | DISCOUNT | CUSTOMER RATING |
|---|---|---|---|---|
| 1234567 | JOE SMITH | 42 SILVER ST. TOWN, CT | 4.0% | A |

METHOD AND APPARATUS FOR DETERMINING A PROGRESSIVE DISCOUNT FOR A CUSTOMER BASED ON THE FREQUENCY OF THE CUSTOMER'S TRANSACTIONS

The present application is a continuation of commonly-owned, U.S. patent application Ser. No. 09/166,267, entitled "METHOD AND APPARATUS FOR DETERMINING A PROGRESSIVE DISCOUNT FOR A CUSTOMER BASED ON THE FREQUENCY OF THE CUSTOMER'S TRANSACTIONS", filed on Oct. 5, 1998 and issued as U.S. Pat. No. 6,687,679B1 on Feb. 3, 2004; which is a continuation-in-part application of commonly-owned, co-pending U.S. patent application Ser. No. 09/049,297, entitled "SYSTEM AND METHOD FOR TRACKING AND ESTABLISHING A PROGRESSIVE DISCOUNT BASED UPON A CUSTOMER'S VISITS TO A RETAIL ESTABLISHMENT" filed on Mar. 27, 1998.

CROSS-REFERENCE TO RELATED APPLICATION

The present application is related to commonly-owned, U.S. Patent Applications: No. 09/166,339, entitled METHOD AND APPARATUS FOR MAINTAINING A CUSTOMER DATABASE USING LICENSE PLATE SCANNING, filed on Oct. 5, 1998, which issued as U.S. Pat. No. 6,374,240 B1 on Apr. 16, 2002, which is incorporated by reference herein as part of the present disclosure.

FIELD OF THE INVENTION

The present invention relates to point-of-sale systems, and more specifically to methods and systems for determining and applying discounts through point-of-sale systems.

BACKGROUND OF THE INVENTION

In most areas of business several entities compete for the same set of potential customers. Consequently, each business must aggressively pursue marketing strategies to attract customers and induce customer loyalty to their particular establishment. For example, the grocery store industry is highly competitive. There are approximately seventy-five large supermarket chains in the United States. In an attempt to attract customers, members of the grocery store industry have employed a number of different promotions such as frequent shopper programs and weekly coupon specials. Despite these efforts, however, customer loyalty is no longer inherent due to the intense competition.

Conventional methods of attracting and developing customer loyalty to a supermarket chain include television and radio advertising to promote particular stores. In addition, some stores offer free standing inserts (FSIs), coupons, and loss leaders in order to attract consumers. These methods, however, erode the gross margin of the stores without retaining the stores' best customers. Furthermore, weekly-advertised specials and coupons by their very nature only attract customers for a particular time period. Since the specials or discounts typically vary from week to week, there is no guarantee or likelihood that a store will be discounting exactly what the customer is interested in buying every grocery trip. Most customers, therefore, scan the weekly advertisement of every grocery store in their area before doing their weekly grocery shopping and choose to go to the store that most meets their needs. Hence, the customer is not loyal to a single store or chain of stores.

Another attempt to attract customers is the implementation of a frequent shopper program. Such a program typically provides a customer with a frequent shopper card that is to be presented at the time of a transaction. Presentation of the card identifies the customer and enables the customer to receive preferential treatment, such as discounts on specific items purchased. Essentially, these frequent shipper programs act much like a paperless coupon redemption system. The frequent shopper programs are also used by the business to track a customer's shopping habits. The frequent shopper card includes a customer identifier that enables the retailer to identify, record and track a customer's purchases. The customer's shopping history may then be used to perform targeted marketing functions, such as compiling mailing lists of recipients of advertising material or printing out point-of-sale (POS) coupons for the customer.

While the frequent shopper program may succeed in attracting the customer to the store on an occasional basis, the program does not successfully ensure the loyalty of the customers. Since many stores have a frequent shopper program, customers may simply acquire a frequent shopper card for every chain of stores in their area and make purchases at the chain that offers the best specials or is the most convenient at any particular time. Accordingly, a frequent shopper program does not provide any incentive (i.e. reward or penalty) for visiting the store on a consistent basis.

A further drawback of the prior art frequent shopper systems is their failure to identify and reward their most frequent and loyal customers over and above less frequent or loyal customers. For example, grocery stores make approximately eighty percent of their revenue from only about thirty percent of their customers. It would therefore be beneficial for the grocery stores to reward and retain as many of the "thirty percent" customers as possible.

Some businesses employ reward programs in order to attract and develop customer loyalty. An example of a typical reward program is one implemented by Arby's, a fast-food chain. The Arby's reward program enables customers to earn prizes that increase in value through a series of sixteen visits, after which the prizes revert to their minimal value and the cycle repeats. Once the maximum prize value is achieved, however, the customer's account is "reset", thus eliminating the customer's incentive to continue choosing Arby's over another fast-food chain. In addition, the Arby's reward program does not promote frequent visits, since there is no time requirement within which the sixteen visits must be made. Thus, the benefits, if any, may be spread over a substantial amount of time.

With the considerable number of businesses in any given area, there exists a need for systems and processes which provide a given business with the ability to reward a particularly loyal customer for consistent patronage to their establishment and to promote and reinforce the customer's loyalty.

SUMMARY OF THE INVENTION

It is an object of the present invention to provide a method and system for determining a discount for a customer based on whether the customer has met certain predetermined conditions.

Generally, according to one aspect of the present invention, a POS controller receives data representing a transaction and a customer identifier that identifies a customer that is associated with the transaction. The customer identifier may be, for example, in the form of (i) an alphanumeric identifier stored on a frequent shopper card, (ii) a credit, debit or smart card account number, (iii) an EZ pass, (iv) a biometric, or (v) a license plate number. The POS controller may receive the transaction data and the customer identifier from a POS terminal when the customer is participating in the transaction. Alternately, the POS controller may receive the transaction data and customer identifier from a database or from previous transactions.

The POS controller in turn determines a customer rating for the customer. The customer rating may be based on the transaction data or may be retrieved from memory based on the customer identifier. The POS controller also retrieves the customer's current discount (i.e. a discount that has not yet been affected by the transaction). The POS controller then determines an updated discount based on the current discount and the customer rating. Generally, the updated discount is greater than the current discount if the customer has participated in a qualifying transaction within a predetermined time period. The updated discount is generally less than the customer discount if the customer has not participated in a qualifying transaction within a predetermined time period.

The discount may be decreased by a predefined decrement (e.g., 1.0%) or decreased down to zero (0%). Different decrements may be associated with different customer ratings. The POS controller stores the updated discount in association with the customer identifier. The POS controller may further communicate the updated discount to a POS terminal which applies the updated discount to the customer's current transaction.

The determination of the customer rating may be based on (i) the transaction price of one or more transactions; (ii) the products included in one or more transactions; and/or (iii) the time since the customer's last transaction at the business. The determination of the customer rating may affect (i) the discount increment from the current discount to an updated discount; (ii) the maximum discount allowed; (iii) the length of the grace period, before the current discount is decreased; and/or (iv) the transaction frequency requirement, i.e. the maximum length of time between customer transactions in order to qualify for an increased discount.

BRIEF DESCRIPTION OF THE DRAWINGS

FIG. 6 is a schematic illustration of a frequent shopper database of the POS controller of FIG. 4.

FIG. 7 is a schematic illustration of another embodiment of the frequent shopper database of the POS controller of FIG. 4.

FIG. 8 is a schematic illustration of another embodiment of the frequent shopper database of the POS controller of FIG. 4.

FIG. 9A is a schematic illustration of a customer rating database of the POS controller of FIG. 4.

FIG. 9B is a schematic illustration of another embodiment of the customer rating database of the POS controller of FIG. 4.

FIG. 9C is a schematic illustration of another embodiment of the customer rating database of the POS controller of FIG. 4.

FIG. 9D is a schematic illustration of another embodiment of the customer rating database of the POS controller of FIG. 4.

FIG. 10 is a schematic illustration of a record of a transaction database of the POS controller of FIG. 4.

FIG. 14 is a schematic illustration of records of databases of the POS controller of FIG. 4, containing exemplary data.

DETAILED DESCRIPTION OF THE PREFERRED EMBODIMENTS

Figure 1:
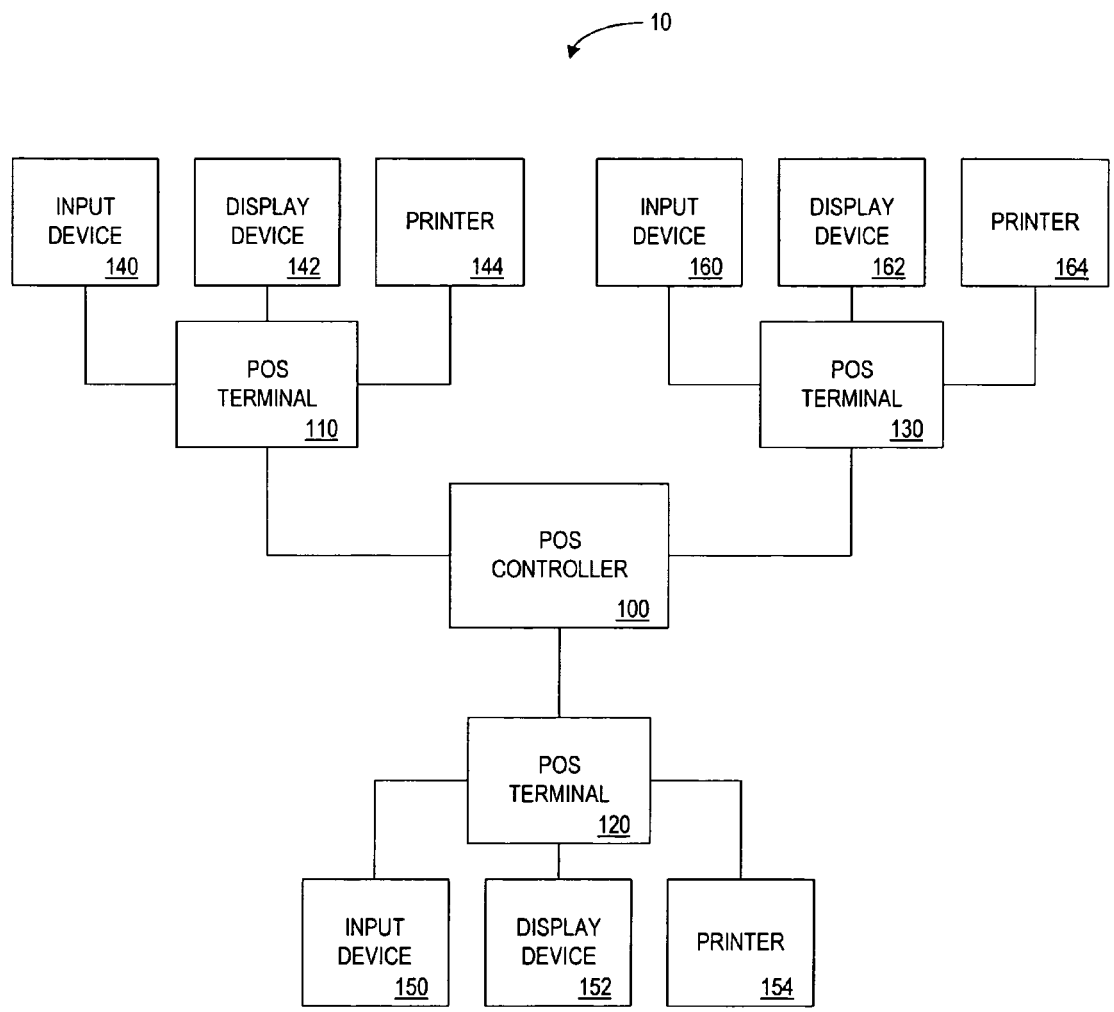
FIG. 1 is a schematic illustration of a progressive discount system provided in accordance with the present invention.

In accordance with the present invention, there are provided new and improved systems and methods that enable a business to provide a customer with a discount that increases as the customer participates in transactions at least once in every pre-defined time period (e.g., once per week). The system further enables businesses to identify and preferentially reward customers that the business considers most profitable. For example, a business may consider a customer that spends on average $100 every week more profitable than one who spends $50 every week. These more profitable customers may be rewarded with (i) discounts that increase by larger increments; (ii) the possibility of higher maximum discounts; and/or (iii) a longer grace period before the discounts are reduced or eliminated.

The present system rewards customers based on their customer rating. The customer rating allows the business to identify the more profitable customers. The customer rating may be determined based on various conditions defined by the business. Such conditions may consist of for example, having at least one $100 transaction every week in order to qualify for a first rating or having at least one $50 transaction every week in order to qualify for a second rating. The customer rating may be determined for each customer based on their historical transaction information. Alternatively, the customer rating may be determined on a per-transaction basis at the POS terminal. The customer may (i) pre-register for a customer rating and thereby agree to abide by the conditions set out for that rating in order to earn the progressive discount; (ii) have a rating assigned to them and updated by the system based on the customer's historical transactions, thus "earning" their way to a higher rating; and/or (iii) have a rating determined for them by the system based on each individual transaction at the time of the transaction.

The following terms are used throughout the remainder of this section. For purposes of construction, such terms shall have the following meanings:

The term "product", unless otherwise specified, refers to anything sold or offered for sale by a business.

The term "business", unless otherwise specified, refers to any entity that allows customers to purchase products. A business may be, for example, a retail store such as a warehouse, a supermarket, or grocery store, a department store, or any other merchandising establishment.

The term "customer", unless otherwise specified, refers to any person, group of people, or other entity that visits or otherwise patronizes a business and/or purchases products from the business.

The term "transaction", unless otherwise specified, refers to an exchange of a product offered by a business for a payment or other consideration provided by the customer.

The aforementioned and defined terms are used below to describe the preferred embodiments of the present invention. Where appropriate, like terms are referred to with like reference numerals.

The following paragraphs illustrate the structural and operational aspects of the present invention. The structural aspects are illustrated first and are followed by a description of the operational aspects.

Referring now to FIG. 1 therein depicted is a schematic illustration of a progressive discount system 10 for a business. The progressive discount system 10 is operable to record a customer's transaction, determine the customer's discount in accordance with the customer rating of the customer, and apply the discount to the customer's transaction. The progressive discount system 10 includes a point of sale (POS) controller 100 and a plurality of POS terminals 110, 120, and 130. The progressive discount system 100 may include any number of POS terminals although three are shown in FIG. 1. The POS terminals 110, 120, and 130 are in communication with the POS controller 100 via data links, which may be wired or wireless. Each of the POS terminals 110, 120, and 130 is also connected to a respective printer, display device, and input device. POS terminal 110 is connected to input device 140, display device 142, and printer 144, POS terminal 120 is connected to input device 150, display device 152, and printer 154, and POS terminal 130 is connected to input device 160, display device 162 and printer 164.

Each input device communicates information to its respective POS terminal and may consist of, for example, a scanning device (e.g., an optical bar code scanner), a keyboard, or a magnetic stripe reader. The communicated information may be, for example, products included in a current transaction and a customer identifier. Each display device receives information from, and is controlled by, its respective POS terminal, and may display the information to the cashier operating the POS terminal, to the customer, or a combination thereof. The displayed information may consist of, for example, the transaction price and/or the discount of the customer that is being applied to the transaction. The display device may consist of, for example, a video monitor. Each printer is controlled by its respective POS terminal and outputs information such as the receipt for the current transaction and an indication of the discount applied to the transaction.

Figure 2:
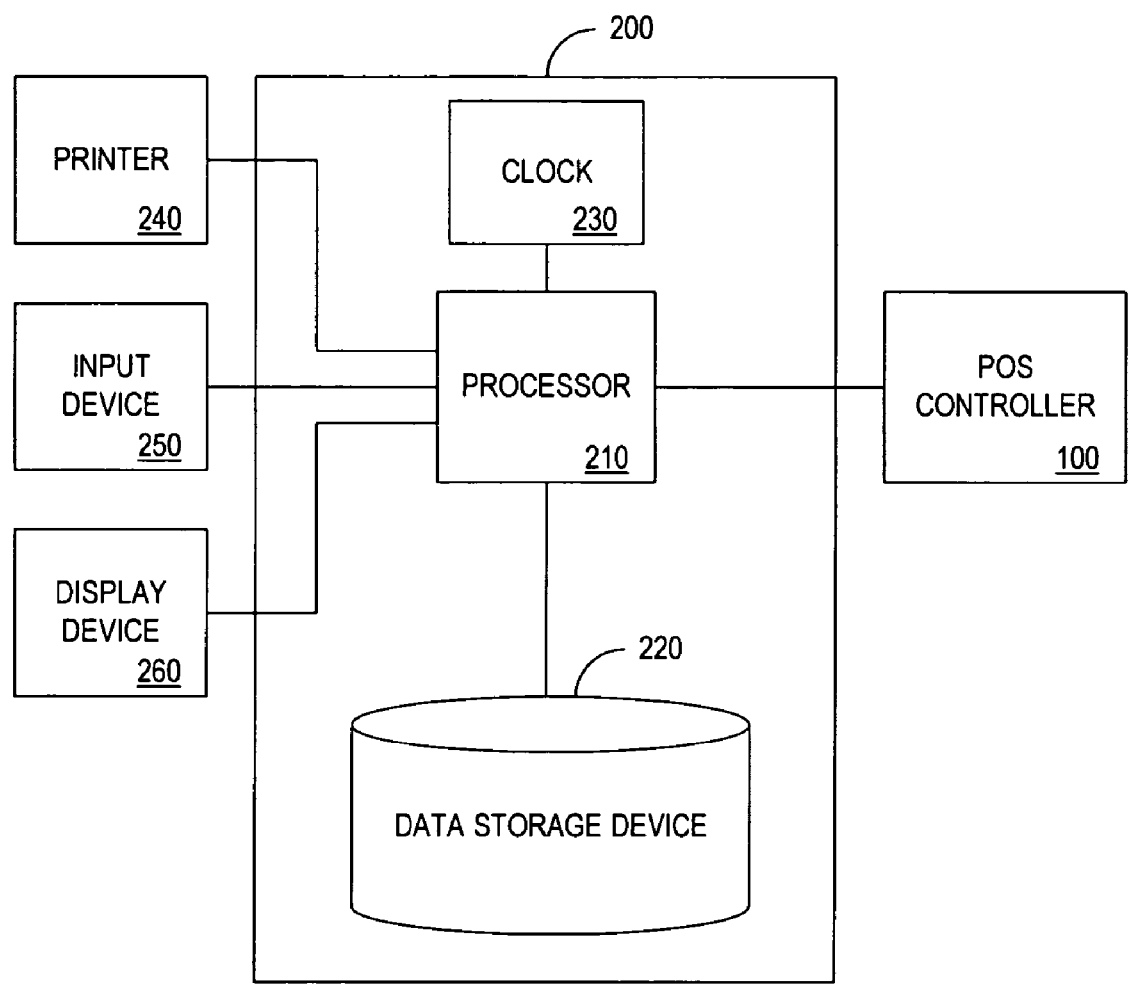
FIG. 2 is a schematic illustration of a POS terminal of the progressive discount system of FIG. 1.

FIG. 2 depicts a POS terminal 200 which is descriptive of any or all of the POS terminals 110, 120, and 130 (FIG. 1). The POS terminal includes a processor 210, such as one or more conventional microprocessors, e.g., Intel Pentium® microprocessors. The processor 210 is connected to a data storage device 220, a clock 230, a printer 240, an input device 250, a display device 260 and the POS controller 100. The data storage device 220 comprises an appropriate combination of magnetic, optical and/or semiconductor memory, such as random access memory (RAM), read only memory (ROM), floppy disk, hard disk or combination thereof. The connection of POS terminal 200 to the printer 240, the input device 250, the display device 260 and the POS controller 100 depicts the arrangement as shown in FIG. 1, where each POS terminal is connected to the POS controller and to a respective printer, input device, and display device.

The processor 210 and the data storage device 220 may each be (i) located entirely within a single computer or computing device; (ii) connected thereto by a remote communication link, such as a serial port cable, telephone line or radio frequency transceiver; or (iii) a combination thereof. For example, the POS terminal 200 may comprise one or more cash registers connected to a remote server computer for maintaining databases. Many types of conventional cash registers and other types of POS terminals may be used to implement the present invention in light of the present disclosure. Such POS terminals may only require software upgrades, which are typically performed without undue effort.

The data storage device 220 stores a POS program (not shown) for controlling the processor 210. The processor 210 performs instructions of the POS program, and thereby operates in accordance with the present invention, and particularly in accordance with the methods described in detail herein. The POS program furthermore includes program elements that may be necessary, such as an operating system and "device drivers" for allowing the processor 210 to interface with computer peripheral devices, such as the printer 240, the input device 250, and the display device 260. Appropriate device drivers and other necessary program elements are known to those skilled in the art, and need not be described in detail herein.

The clock 230 is for measuring the time of a transaction. The time may consist of the date and/or time of day, and may be stored in association with other transaction information, such as the price of the transaction. The printer 240 is for registering indicia on paper or other material, thereby generating sales receipts and discount acknowledgments as controlled by the processor 210. The input device 250 preferably comprises a keypad for transmitting input signals, such as signals indicative of a transaction, to the processor 210. The input device 250 may also comprise an optical bar code scanner for reading bar codes and transmitting signals indicative of those bar codes to the processor 210. The display device 260 is preferably a video monitor for displaying at least alphanumeric characters to the customer and/or cashier, as directed by the processor 210. Many types of input devices, printers, and display devices are known to those skilled in the art, and need not be described in detail herein.

Figure 3:
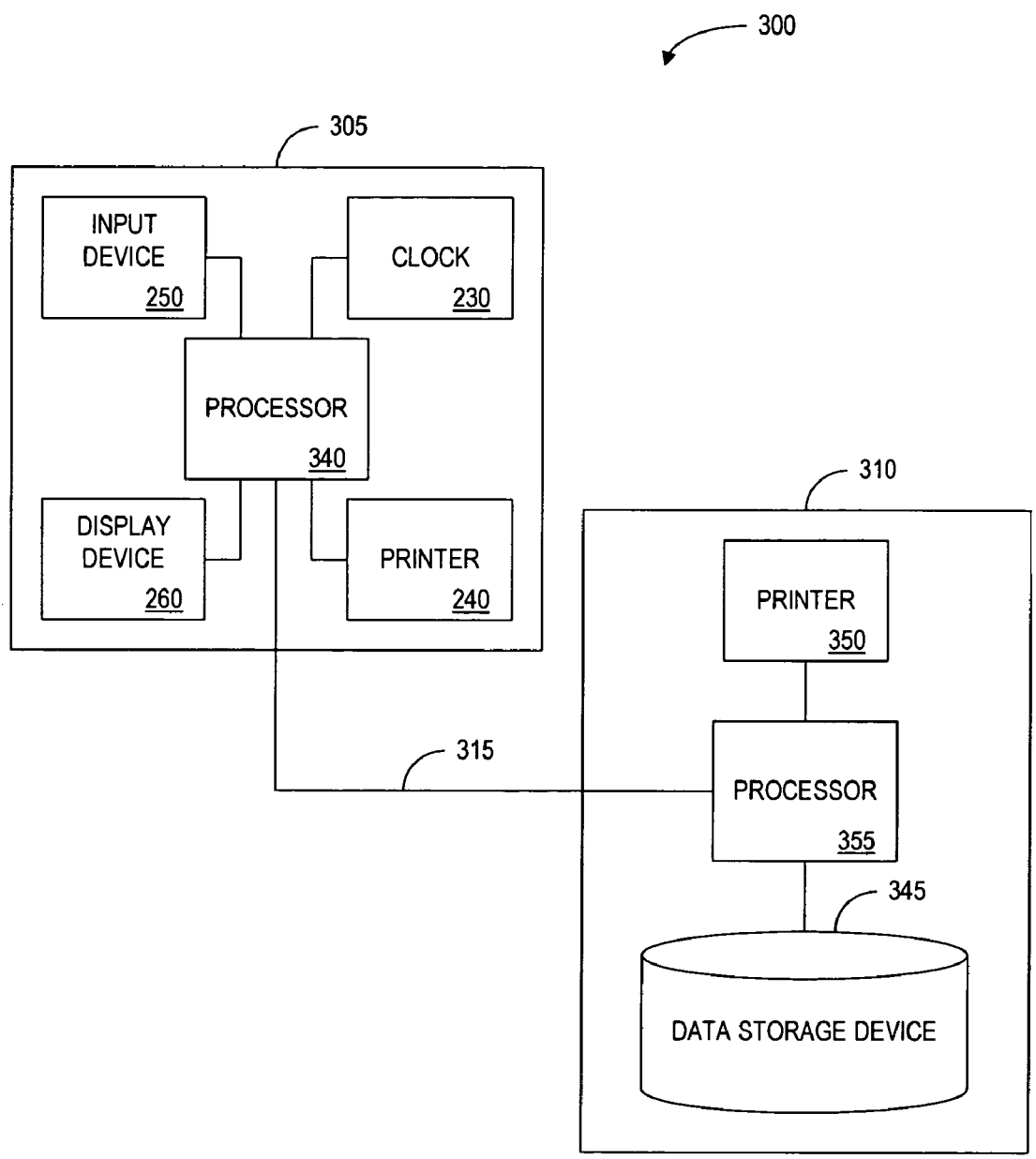
FIG. 3 is a schematic illustration of an alternate embodiment of a POS terminal of the progressive discount system of FIG. 1.

FIG. 3 illustrates a POS terminal 300, which is descriptive of another embodiment of any or all the POS terminals 110, 120, and 130 (FIG. 1). In the embodiment of FIG. 3 first device 305 communicates with a second device 310 via a remote communication link 315. The first device 305, which may be a cash register, comprises the clock 230, the printer 240, the input device 250, the display device 260, and a processor 340 which performs at least some of the functions of the processor 210 of FIG. 2. The second device 310 may be, for example, a processing system operated by an electronic marketing service or credit card clearinghouse. The second device 310 comprises a data storage device 345, a printer 350, and a processor 355 which performs at least some of the functions of the processor 210 of FIG. 2. In this embodiment, the first device 305 may be a cash register, and the second device 310 may be an electronic device for determining discounts in accordance with data received from the cash register. Other configurations of the POS terminal 300 will be understood by those skilled in the art.

Figure 4:
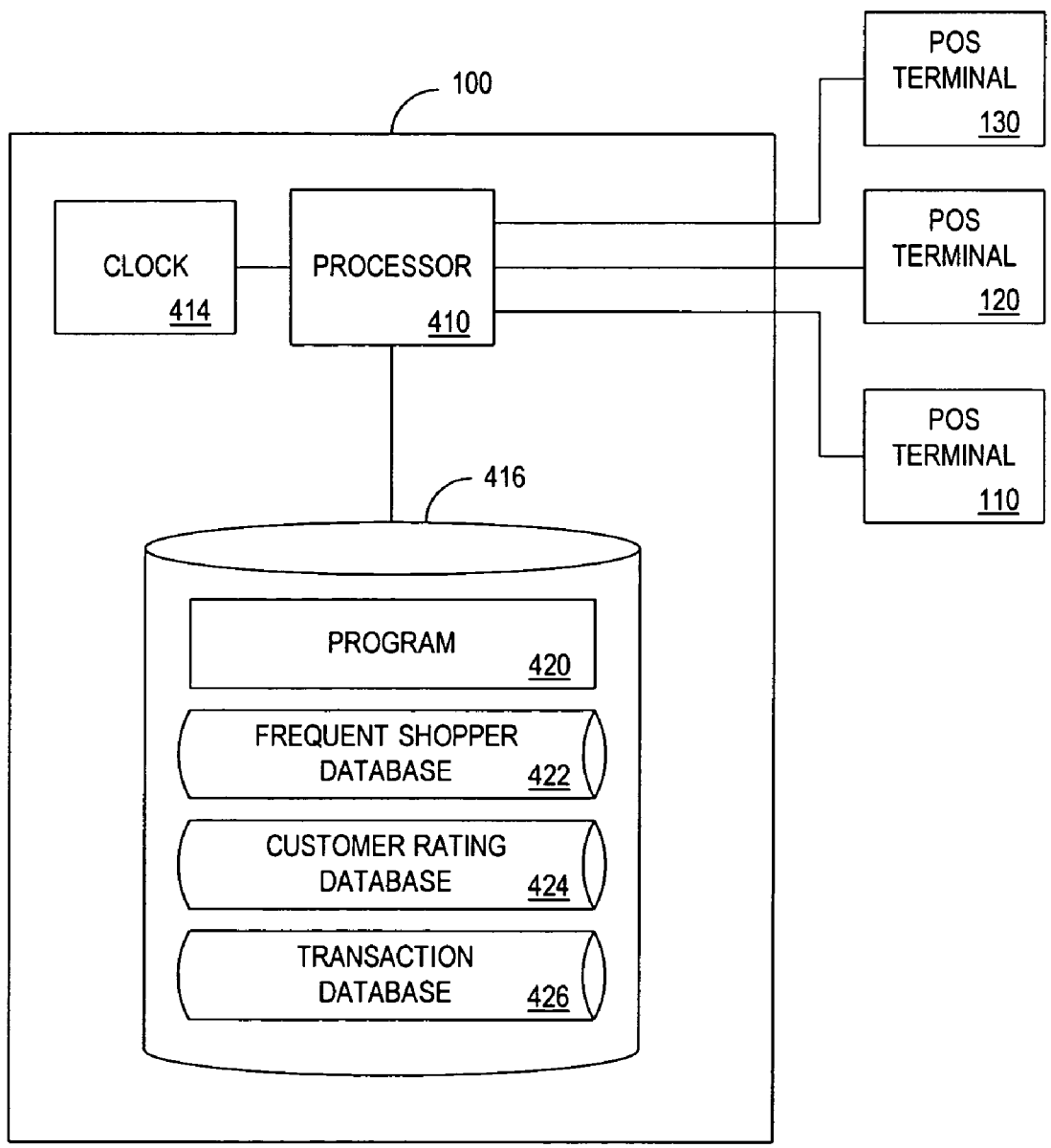
FIG. 4 is a schematic illustration of a POS controller of the progressive discount system of FIG. 1.

FIG. 4 depicts a schematic illustration of the POS controller 100. POS controller 100 comprises a processor 410 in communication with a clock 414 and a data storage device 416. POS controller 100 is also in communication with POS terminals 110, 120 and 130, in accordance with the arrangement illustrated in FIG. 1.

Processor 410 may comprise one or more conventional microprocessors, e.g., Intel Pentium® microprocessors. The data storage device 416 stores a program 420. The program 420 controls the processor 410 in accordance with the present invention, and particularly in accordance with the processes described in detail hereinafter. The program 420 also includes necessary program elements, such as "device drivers" for interfacing with any or all of the POS terminals 110, 120, and 130 (FIG. 1), as well as with a license plate reader system described below in accordance with another embodiment of the present invention. Appropriate device drivers and other necessary program elements are known to those skilled in the art, and need not be described in detail herein.

The data storage device 416 also stores (i) a frequent shopper database 422 for storing information associated with each registered customer, (ii) a customer rating database 424 for storing an indication of conditions and benefits associated with different customer ratings, and (iii) a transaction database 426 for storing information associated with transactions of the business employing the progressive discount system 10. In another embodiment, the databases 422, 424, and 426 may be stored on more than one POS controller or on a remote server (not shown). In such an alternate embodiment, the POS controller 100 may query the other controllers or remote server (not shown) to obtain the information stored in the databases. The databases 422, 424, and 426 are described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides the tables shown. Similarly, the illustrated entries represent exemplary information, but those skilled in the art will understand that the number and content of the entries can be different from those illustrated herein.

Data storage device 416 may comprise an appropriate combination of magnetic, optical and/or semiconductor memory, such as random access memory (RAM), read only memory (ROM), floppy disk, hard disk or a combination thereof. The processor 410 and the data storage device 416 may each be (i) located entirely within a single computer or computing device; (ii) connected thereto by a remote communication link, such as a serial port cable, telephone line or radio frequency transceiver; or (iii) a combination thereof.

The clock 414 is utilized by the processor 410 to determine the present date and/or time of day when determining and/or applying a discount. The clock 414 and the processor 410 may each be (i) located entirely within a single computer or computing device; (ii) connected thereto by a remote communication link, such as a serial port cable, telephone line or radio frequency transceiver; or (iii) a combination thereof.

Figure 5:
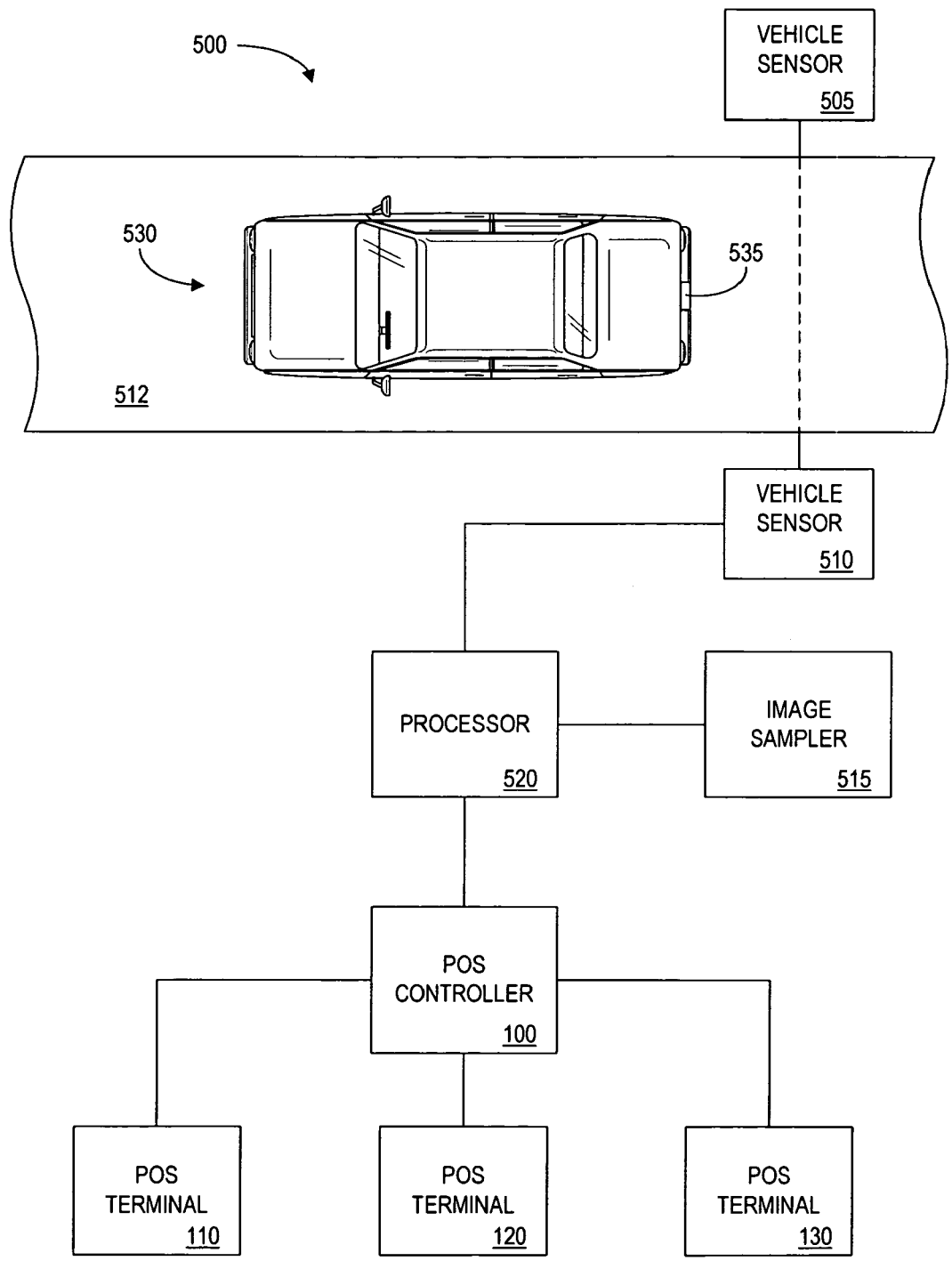
FIG. 5 is a schematic illustration of an alternate system for receiving a customer identifier in the progressive discount system of FIG. 1.

FIG. 5 is a schematic illustration of a license plate reader system 500, that employs license plate characters as a customer identifier for use in the progressive discount system 10 (FIG. 1). The license plate reader system 500 comprises (i) vehicle sensors 505 and 510, positioned, for example, on opposite sides of a roadway 512 such as a drive-thru alley in a fast food restaurant; (ii) an image sampler 515; (iii) a processor 520 in communication with the image sampler 515 and vehicle sensors 505 and 510; (iv) the POS controller 100 (FIG. 1) in communication with the processor 520; and (v) POS terminals 110, 120, and 130 (FIG. 1) which are in communication with POS controller 100. Located on the roadway 512 is a vehicle 530 with an attached license plate 535. License plate reader systems are described in U.S. Pat. No. 4,878,248 to Shyu et al., U.S. Pat. No. 4,817,166 to Gonzalez et al., and U.S. Pat. No. 5,081,685 to Jones, III et al., each incorporated by reference herein.

The vehicle sensors 505 and 510 are adapted to detect the presence, and then the absence, of a vehicle. The vehicle sensors 505 and 510 may comprise, for example, pressure sensors under the ground that detect the presence of vehicle 530 by sensing it's weight. Alternately, vehicle sensors 505 and 510 may comprise, respectively, a light transmitter and a receiving photo sensor that cooperate to detect the presence of the vehicle 530 when the transmitted light is blocked by the vehicle 530 and thus is not received by the receiving sensor. Other means for detecting the presence of a vehicle will be understood by those skilled in the art.

The presence of the vehicle 530 is detected by the vehicle sensors 505 and 510 and is signaled to the processor 520. The processor 520, in turn, triggers the activation of the image sampler 515. The image sampler 515 may comprise a video camera that samples an image of the license plate 535 and converts it into an image signal. The image sampler 515 may further be programmed to focus on the license plate 535 of the vehicle 530. In alternate embodiments, the focusing on the license plate 535 may be the function of processor 520. Once the image of the license plate has been sampled, the image is sent to the processor 520, which processes the image of the license plate to recognize the characters on the license plate.

The processor 520 may perform optical character recognition (OCR) on the image of the license plate in order to determine the customer identifier. OCR is a process in which an image of characters is analyzed to determine the shapes of the characters by detecting patterns of dark and light. Once the shapes are determined, character recognition methods (pattern matching with stored sets of characters) are used to translate the shapes into computer text. Sometimes OCR is done with special readers, but often it is done using a standard image sample and specialized software.

Once the image of the license plate has been processed by processor 520 to generate a set of characters, the set of characters are communicated to the POS controller 100. POS controller 100 recognizes and utilizes the set of characters as a customer identifier. Co-pending, commonly owned U.S. application Ser. No. 09/166,339 generally describes a method and apparatus for building a database of customers based on scanned license plates. The license plate reader system 500 described is exemplary only. Other arrangements will be understood by those skilled in the art.

Referring now to FIG. 6, a table 600 illustrates an embodiment of the frequent shopper database 422 (FIG. 4).

Table 600 is used in embodiments of the invention in which the customer's discount is determined based on the customer rating that is stored in association with the customer identifier of the customer. The table 600 includes entries 602, 604, and 606, each of which describes a customer that is registered with the business that employs the progressive discount system 10 (FIG. 1). It will be understood by those skilled in the art that the table 600 may include any number of entries. The table 600 also defines fields for each of the entries 602, 604 and 606, which specify (i) a customer identifier 610 that identifies the customer, (ii) a name 615 of the customer, (iii) an address 620 of the customer, (iv) a discount 625 to be applied to transactions of the customer, and (v) a customer rating 630 of the customer to be used in determining the customer's discount 625.

Referring now to FIG. 7, a table 700 illustrates another embodiment of the frequent shopper database 422 (FIG. 4). Table 700 is used in embodiments of the present invention in which the customer's discount is determined based on the customer's transactions. That is, a customer rating is not associated with the customer but is instead determined on a per-transaction basis. The table 700 includes entries 702, 704, and 706, each of which describes a customer that is registered with the business that employs the progressive discount system 10 (FIG. 1). It will be understood by those skilled in the art that the table 700 may include any number of entries. The table 700 also defines fields for each of the entries 702, 704 and 706, which specify (i) a customer identifier 710 that identifies the customer, (ii) a name 715 of the customer, (iii) an address 720 of the customer, (iv) a discount 725 earned by the customer to date, and (v) a date of the last transaction 730 of the customer. Each date of the last transaction 730 is used in determining the corresponding discount 725.

Referring now to FIG. 8, a table 800 illustrates another embodiment of the frequent shopper database 422 (FIG. 4). Table 800 is used in an alternate embodiment of the present invention in which license plate characters are used as a customer identifier. The table 800 includes entries 802, 804, and 806, each of which describes a customer that has a record established with the business that employs the progressive discount system 10 (FIG. 1). It will be understood by those skilled in the art that the table 800 may include any number of entries. The table 800 also defines fields for each of the entries 802, 804 and 806, which specify (i) license plate characters 810 that serve as a customer identifier, (ii) a discount 815 of the customer, (iii) a date of the last transaction 820 of the customer, and (iv) a customer rating 825 to be used in determining the discount 815 of the customer.

FIGS. 9A–9D illustrate various embodiments of the customer rating database 424 (FIG. 4). The customer rating database 424 stores the customer ratings that may be associated with customers of the business that employs the progressive discount system 10. As described above, the customer rating may be (i) stored in association with the customer identifiers (e.g., in the customer's record of the frequent shopper database 422, as illustrated by table 600 of FIG. 6); or (ii) determined for a customer at the time of a transaction based on transaction information associated with the customer. In either case, FIGS. 9A–9D illustrate different benefits and conditions that may be associated with a particular customer rating. Benefits are advantages to which a customer with a particular customer rating is entitled. For example, a benefit to a customer with a customer rating of "A" may be an entitlement to a 15% maximum discount while the benefit to a customer with a customer rating of "B" may be an entitlement to a 10% maximum discount. It will be understood by those skilled in the art that any number of possible customer ratings may be used, although three are shown in FIGS. 9A–9D.

A condition is a prerequisite that the customer has to meet in order to qualify for a discount increment or to avoid a discount decrement. A transaction that meets such conditions may be referred to as a qualifying transaction. For example, a condition for a customer to qualify for a customer rating of "A" may be to spend at least $100 per week at the business employing the progressive discount system 10 (FIG. 1). Such a condition may be referred to as a required transaction price. The transaction price may be calculated based on (i) a single transaction, or (ii) a sum or other combination of a plurality of transactions (e.g., a sum of transactions during a two week time period).

Depending on the needs of a particular business, it may choose to specify different conditions as well as different benefits to reward customers that qualify for those customer ratings. FIGS. 9A–9D present illustrative examples of benefits and conditions that may be included in the customer rating database 424 (FIG. 4).

Referring now to FIG. 9A, a table 900 illustrates an embodiment of customer rating database 424 (FIG. 4). In the embodiment of FIG. 9A, the benefit associated with different customer ratings is a different discount increment in the discount with each qualifying purchase. For example, a customer rating of "A" has an associated discount increment of 0.5% while a customer rating of "B" has a discount increment of 0.2%. Accordingly, customers with a customer rating of "A" can attain the maximum allowable discount (e.g., 10%) quicker than customers with a customer rating of "B". The conditions associated with different customer ratings of table 900 consist of (i) a minimum number of transactions per time period (e.g., a required transaction frequency), and (ii) a minimum transaction price (e.g., a required transaction price). The two conditions may or may not be mutually exclusive.

The table 900 includes entries 902, 904, and 906, each of which describes a benefit and conditions associated with a customer rating of the progressive discount system 10 (FIG. 1). It will be understood by those skilled in the art that the table 900 may include any number of entries. The table 900 also defines fields for each of the entries 902, 904 and 906, which specify (i) a customer rating 910, (ii) a discount increment 912, (iii) a transaction frequency 914, and (iv) a transaction price 916.

Referring now to FIG. 9B, a table 920 illustrates another embodiment of customer rating database 424 (FIG. 4). In the embodiment of FIG. 9B, the benefit associated with different customer ratings is a maximum allowable discount. Thus, one customer rating has a higher maximum discount associated with it than does another customer rating. The conditions associated with different customer ratings in table 920 consist of (i) a minimum number of transactions per time period requirement (e.g., a transaction frequency), and (ii) a minimum transaction price requirement (e.g., a transaction price).

The table 920 includes entries 922, 924, and 926, each of which defines a benefit and conditions associated with a customer rating of the progressive discount system 10. It will be understood by those skilled in the art that the table 920 may include any number of entries. The table 920 also defines fields for each of the entries 922, 924 and 926, which specify (i) a customer rating 930, (ii) a maximum discount 932, (iii) a transaction frequency 934, and (iv) a transaction price 936.

Referring now to FIG. 9C, a table 940 illustrates another embodiment of the customer rating database 424 (FIG. 4). In the embodiment of FIG. 9C, the benefit associated with different customer ratings is a grace period. A grace period is the length of time from the customer's last transaction to the time when a customer's discount will be decreased as a penalty. The grace period may or may not be equal to the time period associated with the required transaction frequency. For example, a customer rating of "A" may have (i) a required transaction frequency of one transaction per week in order to increase the discount of the customer, and (ii) a grace period of two weeks before the decreasing the discount of the customer. Accordingly, a customer with a customer rating of "A" that completes a transaction one-and-a half weeks after his last transaction will not have his discount increased but will not be penalized with a decrease of his discount. The conditions associated with different customer ratings in table 940 consist of (i) a minimum number of transactions per time period (e.g., a required transaction frequency), and (ii) a minimum transaction price e.g., a required transaction price).

The table 940 includes entries 942, 944, and 946, each of which defines a benefit and conditions associated with a customer rating of the progressive discount system. It will be understood by those skilled in the art that the table 940 may include any number of entries. The table 940 also defines fields for each of the entries 942, 944 and 946, which specify (i) a customer rating 950, (ii) a grace period 952, (iii) a transaction frequency 954, and (iv) a transaction price 956.

Referring now to FIG. 9D, a table 960 illustrates another embodiment of the customer rating database 424 (FIG. 4). In the embodiment of FIG. 9D, the benefit associated with different customer ratings is a discount increment in the discount with each qualifying transaction. The conditions associated with different customer ratings in table 960 consist of (i) a minimum number of transactions per time period (e.g., a required transaction frequency), and (ii) a number of products from specified categories to be included in a transaction in order for the transaction to qualify the customer for the discount increment associated with the customer rating (e.g., required product category). The product category as well as the number of products within that category required per transaction for any given customer rating may be designated by the business employing the progressive discount system 10 (FIG. 1). For example, the business may wish to promote sales of high-margin or its own brand products and therefore designate products of such product categories in the conditions of the customer ratings. Product categories that are included in the requirements for a customer rating would preferably be explicitly stated to the customer and marked accordingly.

The table 960 includes entries 962, 964, and 966, each of which defines a benefit and conditions associated with a customer rating of the progressive discount system 10 (FIG. 1). It will be understood by those skilled in the art that the table 960 may include any number of entries. The table 960 also defines fields for each of the entries 962, 964 and 966, which specify (i) a customer rating 970, (ii) a discount increment 972, (iii) a required transaction frequency 974, and (iv) required product category requirements 976.

Those skilled in the art will recognize additional variations of customer rating benefits and conditions that are within the spirit and scope of the present invention.

Referring now to FIG. 10, a table 1000 represents a record of the transaction database 426 (FIG. 4). The record represents a transaction at the business employing the progressive discount system 10 (FIG. 1). The transaction database 426 typically includes a plurality of records such as that represented by the table 1000, each record defining a transaction. Table 1000 includes (i) a transaction identifier 1010 that uniquely identifies the transaction; (ii) a POS terminal identifier 1020 that uniquely identifies a POS terminal used in the transaction; (iii) a customer identifier 1030 that identifies the customer that participated in the transaction; (iv) a date and time 1040 indicating the time that the transaction occurred; and (v) a transaction price 1050 that identifies the total price of the transaction. Each of the entries 1060, 1062, and 1064 of table 1000 represents a product included in the transaction. Each entry includes (i) a product identifier 1070 which identifies a product included in the transaction; (ii) a product category identifier 1075 which identifies the designated category of the product; (iii) a product price 1080; and (iv) a product quantity 1085. For illustrative purposes, the product category identifier consists of a letter of the alphabet. Those skilled in the art will realize that many other types of product category identifiers may be used.

The transaction illustrated by the table 1000 is for a transaction identified as "985387" that occurred on Jan. 18, 1998 at 3:14 pm, at POS terminal "1118". The transaction "985387" has an associated transaction price of $103.87. Table 1000 also indicates that a customer identified as "1234567" participated in the transaction "985387". Entry 1060 shows that the transaction "985387" included two products "9876" from product category "G", which were $25.50 each. Entry 1062 shows that the transaction "985387" also included two products "6345" from product category "R", which were $18.00 each. Entry 1064 shows that transaction "985387" also included one product "2009" from product category "Z", which was $10.00. Although the table 1000 does not include the tax applied to the transaction in order to obtain the transaction price, those skilled in the art will recognize that such an entry may also be included in the transaction database 426 (FIG. 4) or may be calculated and represented in the transaction price 1050 without an explicit entry.

Figure 11:
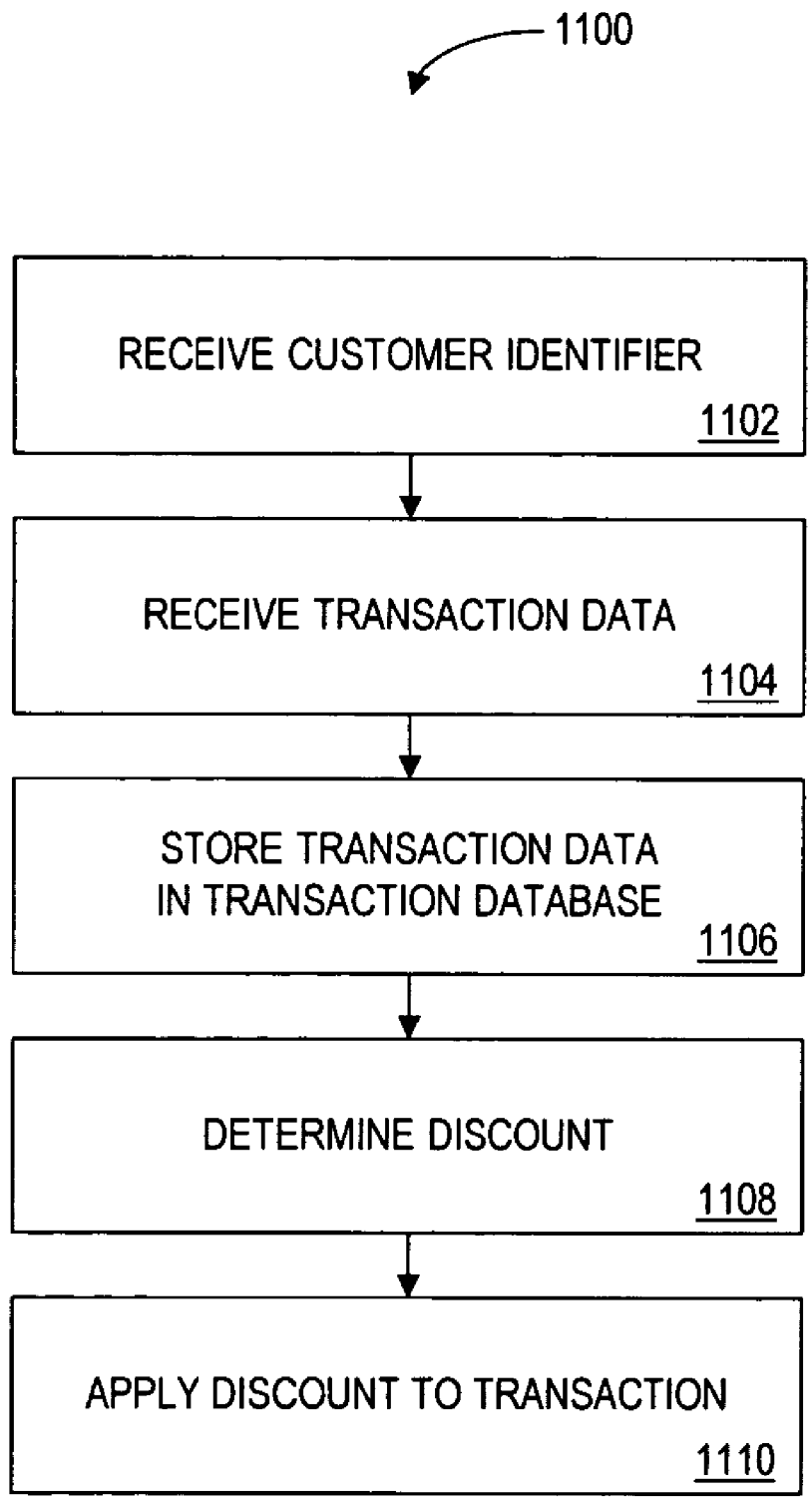
FIG. 11 is a flow chart illustrating a method of the present invention for applying a discount to a transaction.

Referring now to FIG. 11, the depicted flowchart describes a process 1100 for applying a discount to a customer's transaction in accordance with the present invention. The process 1100 for applying a discount may be performed by (i) the POS controller 100 (FIG. 1), (ii) any of the POS terminals 110, 120, or 130 (FIG. 1), or (iii) any combination thereof.

The process 1100 is initiated when a customer identifier is received in step 1102. As described above, the customer identifier may be retrieved (i) via an input device attached to a POS terminal, or (ii) via the license plate reader system 500 (FIG. 5).

The transaction data is then received from the POS terminal in step 1104 and stored in the transaction database 426 (FIG. 4) in step 1106. In some embodiments, some of the transaction data may also be stored in the frequent shopper database 422 (FIG. 4). For example, the date of the transaction may be stored in the date of last transaction field 730 of the frequent shopper database 700 (FIG. 7).

The discount to be applied to the customer's transaction is determined in step 1108. In one embodiment, the step 1108 may consist of retrieving the customer's record from the frequent shopper database 422 and applying the discount stored therein. In other embodiments the step 1108 may include updating the discount based on the data of the current transaction, thereby combining some of the functions performed in the processes of updating a discount described below. For example, the time since the last transaction may be determined based on the current date and the date of the customer's last transaction 730 (FIG. 7). If the time elapsed since the last transaction is within the required time period, the customer's discount, which is stored in the frequent shopper database 422 (FIG. 4), may be incremented, thereby updating the discount. The discount is then applied to the current transaction in step 1110.

Figure 12:
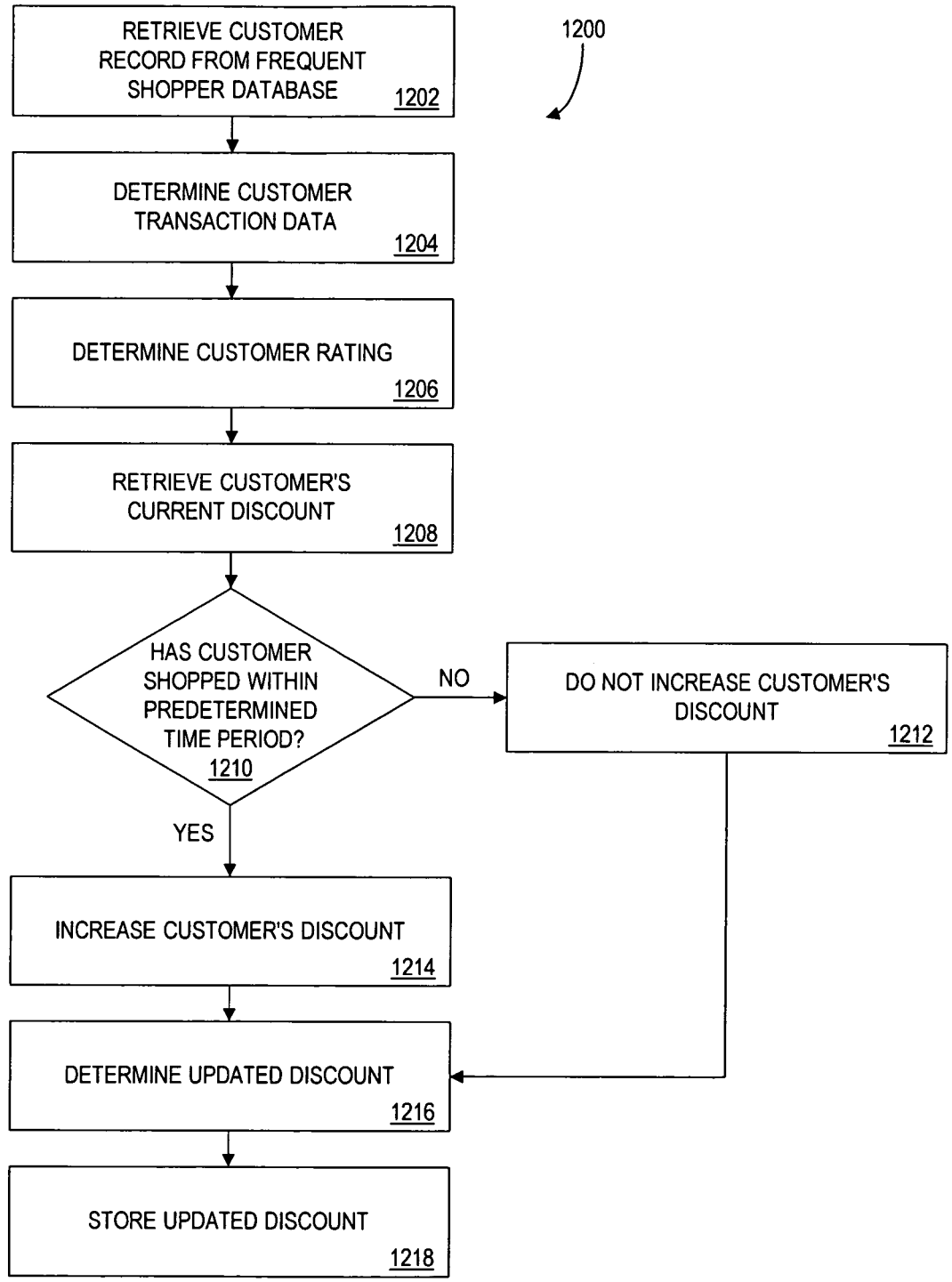
FIG. 12 is a flow chart illustrating a method of the present invention for updating a discount.

Referring now to FIG. 12 therein depicted is a process 1200 for updating the customer's discount in accordance with the present invention. The process 1200 may be performed by (i) the POS controller 100 (FIG. 1), (ii) any of the POS terminals 110, 120, or 130 (FIG. 1), or (iii) any combination thereof. The process 1200 for updating a discount may be performed (i) at the time of a transaction, or (ii) periodically (e.g., once a week). When the process 1200 is performed at the time of a transaction, the update is typically based on the transaction data of the current transaction. When the discount process 1200 is performed on a cyclical basis, the discount update is typically based on historical transactions of the customer, utilizing the records of the transaction database 426 that correspond to the customer.

At step 1202, a customer's record is retrieved from the frequent shopper database 422 (FIG. 4). Step 1202 may be initiated when a customer identifier is received from a POS terminal 110, 120, or 130 (FIG. 1), wherein the retrieved customer record is selected based on the customer identifier that is received. Step 1202 may also be initiated at a pre-determined time (e.g., every Sunday night at midnight) and may comprise the systematic retrieval of each customer record in the frequent shopper database 422 (FIG. 4).

Once the customer record is retrieved in step 1202, the transaction data associated with the customer record is determined in step 1204. The step 1204 of determining the transaction data may comprise determining the transaction data of the current transaction or determining historical transaction data associated with the customer. The customer rating of the customer is then determined in step 1206. Step 1206 may comprise reading the customer rating from the customer's record, which was retrieved in step 1202. In other embodiments of the present invention, step 1206 may comprise determining a customer rating based on the transaction data of the current transaction, which was determined in step 1204.

Once the customer rating is determined in step 1206, the customer's current discount is retrieved in step 1208. This step may comprise reading the customer's current discount from the customer's record in the frequent shopper database 422. For example, if the frequent shopper database 422 comprises table 600 (FIG. 6), the current discount is retrieved from the discount field 625 of the appropriate customer record.

A determination is made whether the customer has participated in a transaction within the required time period (step 1210). This determination may be made by (i) comparing the current date (i.e. the date of the current transaction) to the date of the customer's last transaction, or (ii) by accessing the transaction database and determining whether the most recent transaction that the customer participated in was within the predefined time period. The predefined time period is based on the transaction frequency requirement associated with the customer rating of the customer. If it is determined in step 1210 that the customer has not met his transaction frequency requirement, a decision is made in step 1212 not to increase the customer's current discount. In some embodiments, step 1212 comprises decreasing the customer's discount.

If it is determined in step 1210 that the customer has met the transaction frequency requirement, the customer's current discount is increased in step 1214. The amount of the increase or the decrease may be based on the customer rating of the customer. The increase or decrease of the current discount results in an updated discount being determined in step 1216. The updated discount is the discount resulting from the increase, decrease or lack of adjustment of the current discount. The updated discount is stored in the customer's record in step 1218, preferably replacing the current discount retrieved in step 1208. Thus, the updated discount will be used as the current discount at the next update of the customer's discount.

Figure 13A:
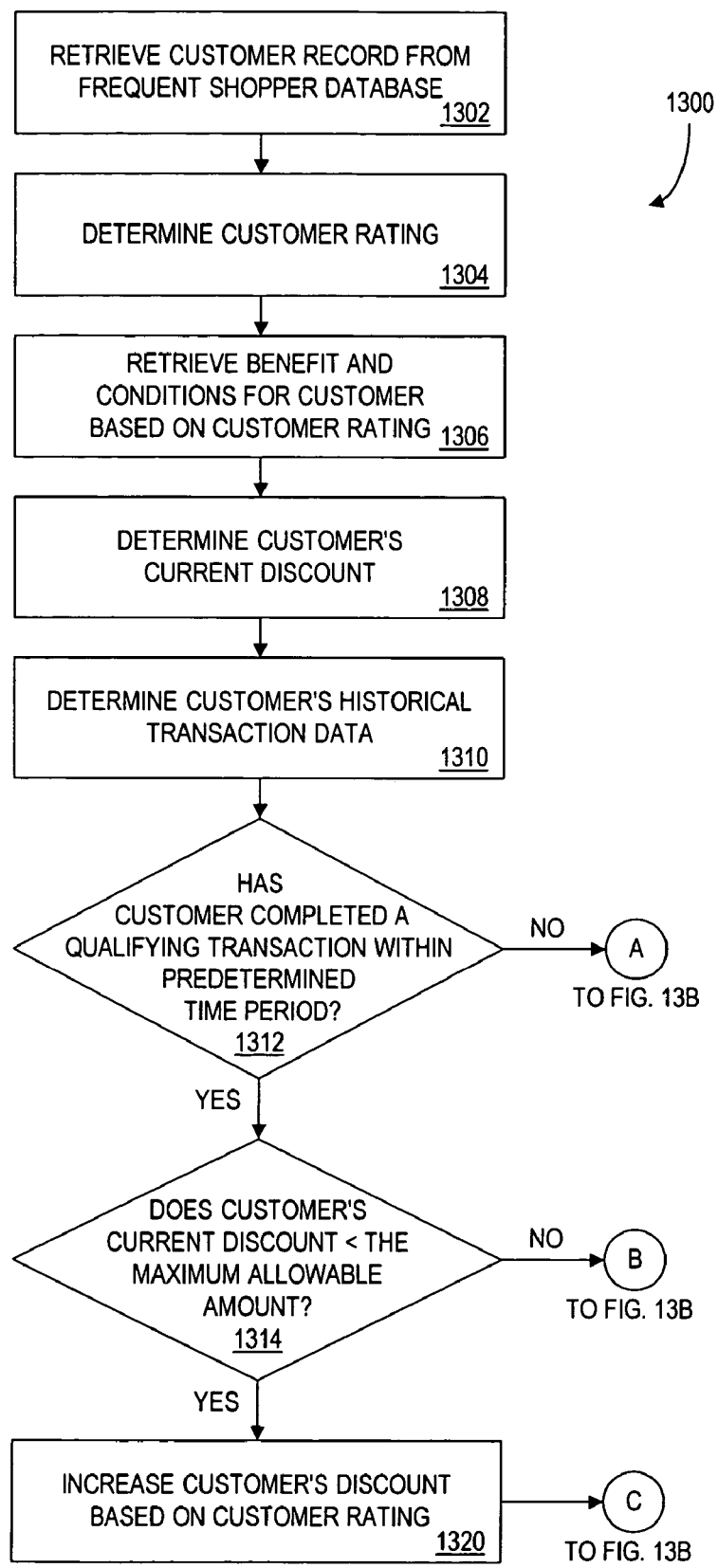
FIGS. 13A and 13B are flow charts illustrating an alternate method for updating a discount.
Figure 13B:
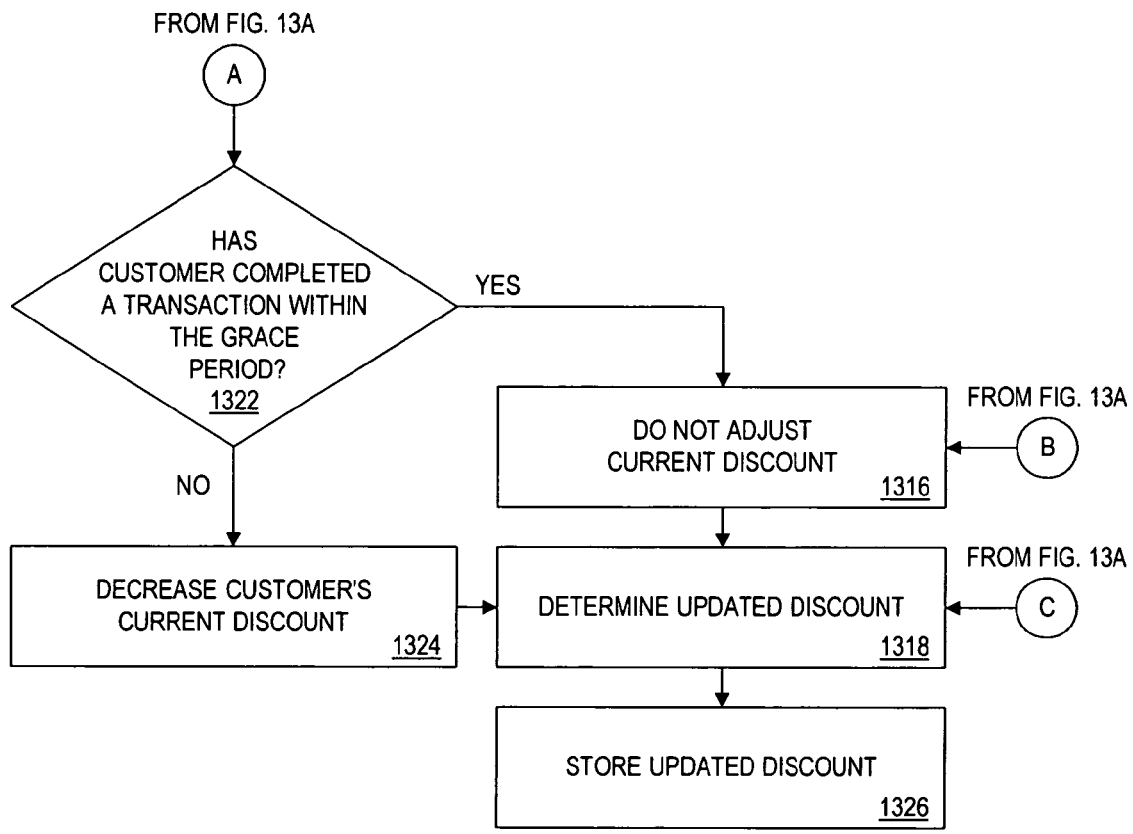

Referring now to FIGS. 13A and 13B, therein depicted is a process 1300 of updating a discount. Process 1300 is generally a more detailed version of an embodiment of the process 1200. Process 1300 is a discount update process that is performed periodically (e.g., once a week). In process 1300, the POS controller 100 (FIG. 1) processes the records of registered customers contained in the frequent shopper database 422, and updates the discount of each customer based on the transaction data associated with the customer. For example, the POS controller 100 (FIG. 1) retrieves each of the customer records and in turn determines whether each customer made a qualifying transaction since the last update. The POS controller 100 increases the discounts of only those customers that have completed a qualifying transaction. In alternate embodiments the process 1300, or portions thereof, may be performed by (i) any or all of the POS terminals 110, 120, or 130 (FIG. 1); or (ii) a combination of POS controller 100 (FIG. 1) and any or all of the POS terminals 110, 120, and 130 (FIG. 1).

Process 1300 utilizes frequent shopper database 422 (FIG. 4), the customer rating database 424 (FIG. 4), and the transaction database 426 (FIG. 4). The step 1302 of process 1300 includes retrieving a customer record from the frequent shopper database 422 (FIG. 4). The customer rating of the customer is determined in step 1304. The conditions and benefits associated with the customer rating are retrieved from the customer rating database 424 (FIG. 4) in step 1306. The customer's current discount is also retrieved from the customer's record of the frequent shopper database 422 (FIG. 4), in step 1308. The transaction database 426 is then accessed and searched for transactions participated in by the customer in step 1310. Step 1310 may comprise retrieving transactions that include both (i) the customer identifier of the customer whose discount is being updated, and (ii) a date that is between the date of the last update and the current date. The transactions retrieved in step 1310 are then used to determine whether the customer has participated in a qualifying transaction.

Step 1312 comprises determining whether the customer has participated in a transaction within the predefined time period as specified in the conditions of the customer rating database 424 (FIG. 4), retrieved in step 1306. Step 1312 may further comprise determining whether other conditions associated with the customer rating have been met (e.g., the transaction price requirement). If it is determined in step 1312 that the customer has participated in a qualifying transaction, the process 1300 continues to step 1314. Step 1314 consists of determining whether the customer's current discount is less than the maximum allowable discount. Such a determination may be performed by comparing the current discount to a maximum allowable discount associated with the customer rating of the customer. The maximum allowable discount may be stored (i) in the program 420 (FIG. 4)

of the POS controller, (ii) in the customer rating database 424 (FIG. 4), or (iii) elsewhere in the memory of progressive discount system 10 (FIG. 1).

If, in step 1314, it is determined that the customer's current discount is not less than the maximum allowable discount, it is determined that the discount may not be increased any further (step 1316). The updated discount is thus determined to be equal to the current discount in step 1318. If, on the other hand, in step 1314, it is determined that the customer's current discount is less than the maximum allowable discount, the current discount is increased in step 1320. The updated discount is thus determined to be greater than the current discount in step 1318.

Referring again to step 1312, if it is determined that the customer has not participated in a qualifying transaction within the predetermined time period, the process continues on to step 1322. Step 1322 consists of determining whether the customer has participated in a qualifying transaction within the predefined grace period. As described above with respect to FIG. 9D, the grace period may or may not be equal to the time period identified in the transaction frequency requirement. If the customer has participated in a qualifying transaction within the predefined grace period, the customer's current discount is not decreased in step 1316 and the customer's updated discount is determined to be equal to the current discount in step 1318. If, in step 1322, it is determined that the customer has not participated in a qualifying transaction during the predefined grace period, the customer's discount is decreased in step 1324 and the updated discount is determined to be less than the current discount in step 1318.

Process 1300 concludes with the step 1326 of storing the updated discount. Preferably, the step 1326 of storing the updated discount comprises storing the updated discount in place of the current discount in the customer's record of the frequent shopper database 422 (FIG. 4). The updated discount thereby becomes the current discount for the next update. In another embodiment, both the current and the updated discounts are retained. The process 1300 repeats for each customer record of the frequent shopper database 422 (FIG. 4).

Referring now to FIG. 14, therein depicted are exemplary data used in conjunction with the process 1300 for updating a discount. The FIG. 14 utilizes entries from (i) the table 600 of FIG. 6, an embodiment of the frequent shopper database 422 (FIG. 4); (ii) the table 900 of FIG. 9A, and an embodiment of the customer rating database 424; and (iii) the table 1000 of FIG. 10 and, an embodiment of the transaction database 426. For purposes of the example illustrated in FIG. 14, it is assumed that the current date is Jan. 20, 1998, that the process 1300 is performed every two weeks, and the last update occurred on Jan. 6, 1998. It will also be assumed that the grace period (2 weeks) equals the transaction frequency requirement (also involving a two week period) and that the maximum allowable discount is 10.0%.

The FIG. 14 consists of entry 1400A, entry 1400B, entry 1400C, and entry 1400D. Entry 1400A is an entry from the table 600 (FIG. 6), showing a customer entry before the discount update. Entry 1400A includes data shown in entry 602 of FIG. 6. Figure numeral 1402 indicates the discount before the discount update. Entry 1400B is an entry from the table 900 (FIG. 9A), showing the benefit and conditions associated with the customer rating illustrated in the customer entry 1400A. Entry 1400B includes data shown in the entry 902 of FIG. 9A. Record 1400C is the record of the transaction database 426 (FIG. 4) that is illustrated in FIG. 10. Record 1400C is an example transaction record associated with the customer indicated by entry 1400A. Record 1400C shows a transaction that occurred between the time of the last update and the time of the current update. Entry 1400D is a version of entry 1400A after the discount update. Figure numeral 1404 indicates the updated discount which resulted from utilizing the data in entry 1400B and record 1400C to update the discount 1402 of entry 1400A.

Following the process 1300 (FIGS. 13A and 13B), the customer record is retrieved in step 1302 and the customer rating of the customer is determined in step 1304. Entry 1400A shows that customer "1234567" has an associated customer rating of "A". The benefits and conditions associated with the customer rating are retrieved from the customer rating database 424 in accordance with step 1306. Entry 1400B shows that a condition for increasing a discount of a customer with a customer rating of "A" includes having at least one transaction per two week time period. Entry 1400B also shows that another condition is a transaction price of at least $100. The benefit indicated in entry 1400B is a 0.5% discount increment.

The customer's current discount is then determined in accordance with step 1308. Figure numeral 1402 indicates that customer "1234567" has a current discount of "3.5%". The next step in process 1300 is a determination of the customer's historical transaction data in step 1310. Record 1400C shows that customer "1234567" had participated in a transaction "985387" on Jan. 18, 1998. Record 1400C also shows that the transaction price of transaction "985387" was $103.87. In determining whether the customer has completed a qualifying transaction within the predefined time period, as per step 1312, it is determined that Jan. 18, 1998 is within the two week time period required, since it occurred between the time of the last update and the current update, which is a two week time period. Also, the transaction price of $103.87 of transaction "985387" is greater than the transaction price requirement of $100. The current discount of 3.5% is also less than the maximum allowable discount of 10.0% described above, satisfying the determination of step 1314.

As described above, the customer "1234567" has met the conditions of his associated customer rating and therefore qualifies for a discount increment of 0.5%, which is performed in accordance with step 1320 (i.e. transaction "985387" is a qualifying transaction). Figure numeral 1404 indicates that the discount has thus been incremented from 3.5% to 4.0%.

Figure 15A:
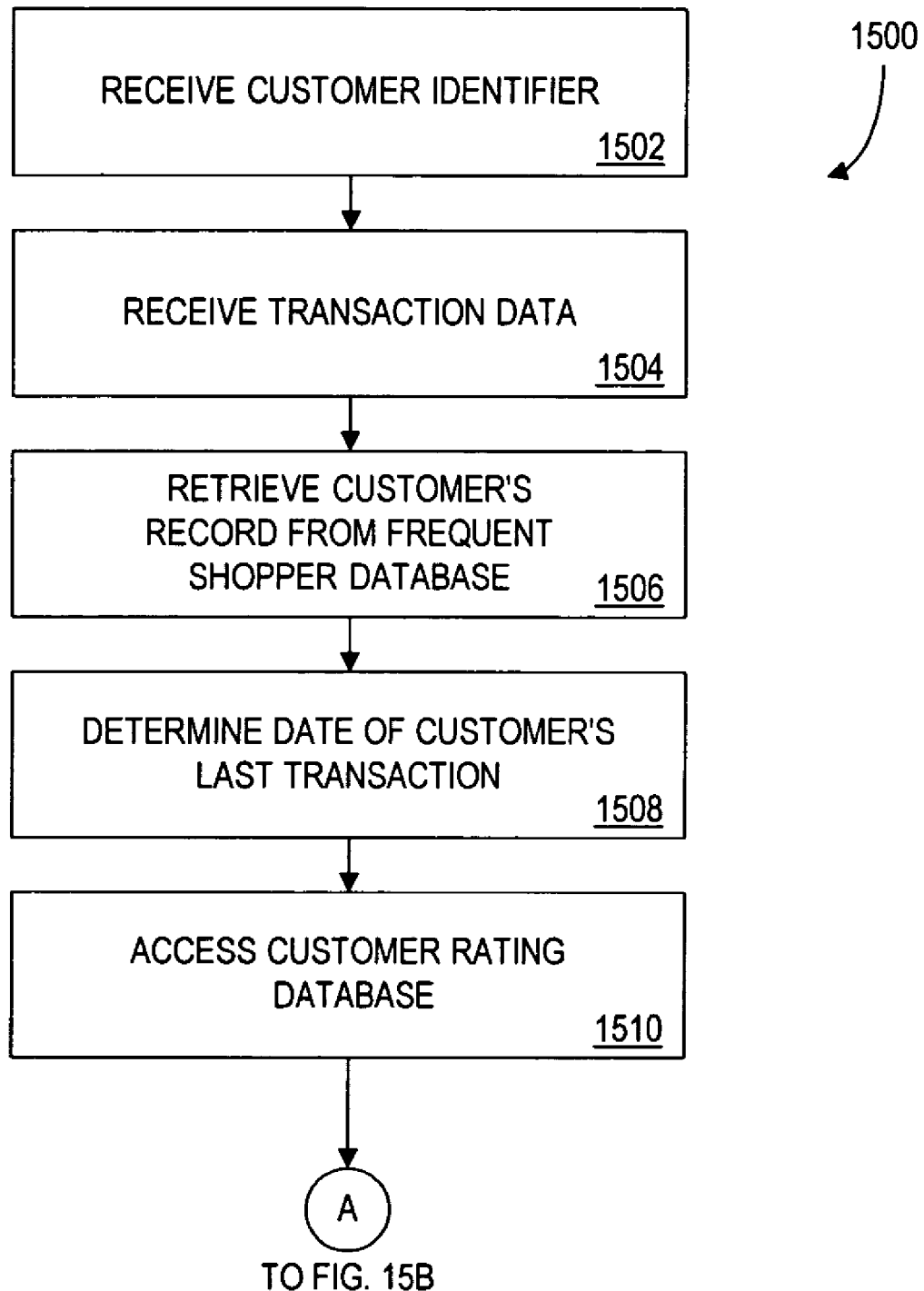
FIGS. 15A, 15B, and 15C are flow charts illustrating an alternate method of updating and applying a discount.
Figure 15B:
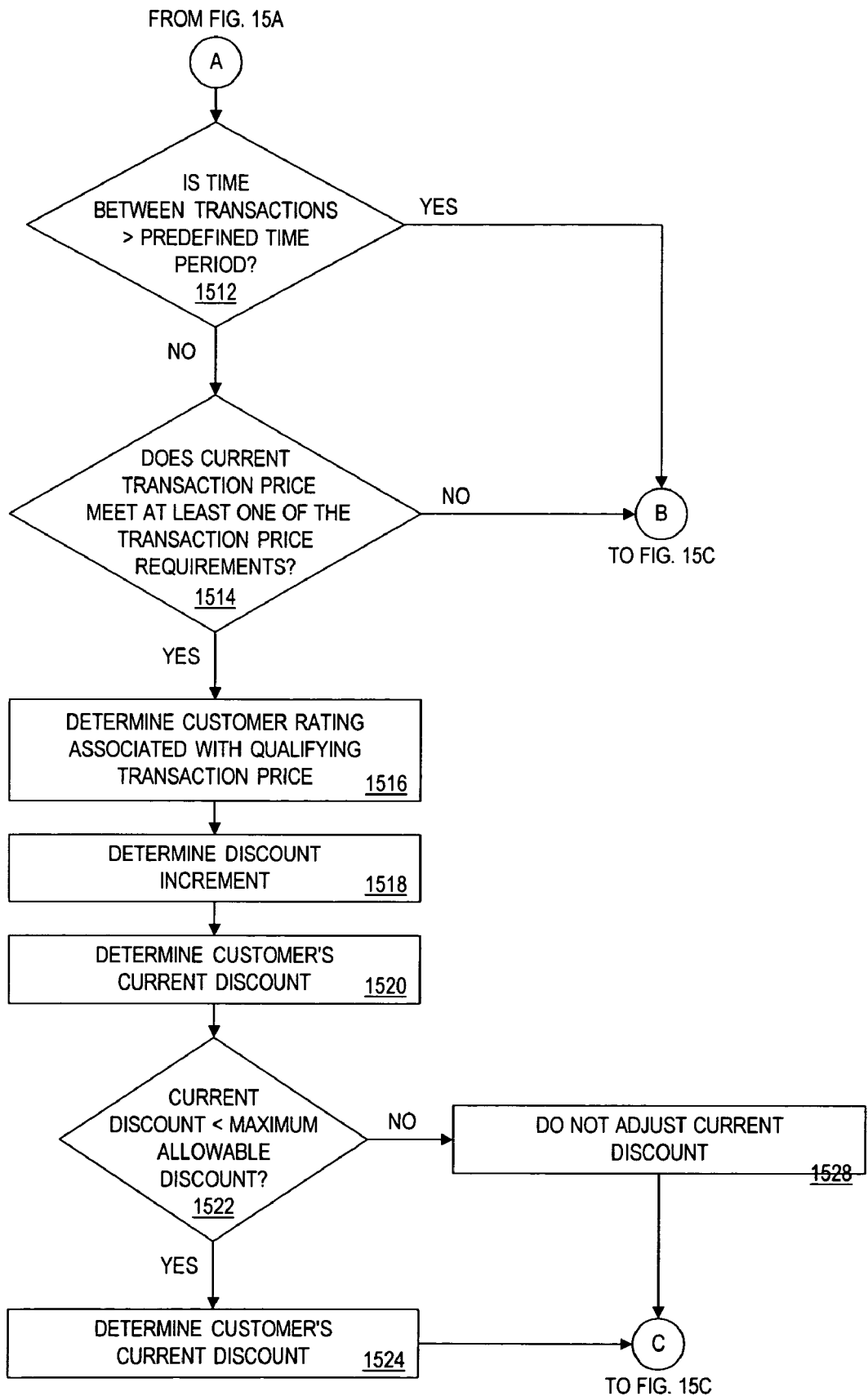
Figure 15C:
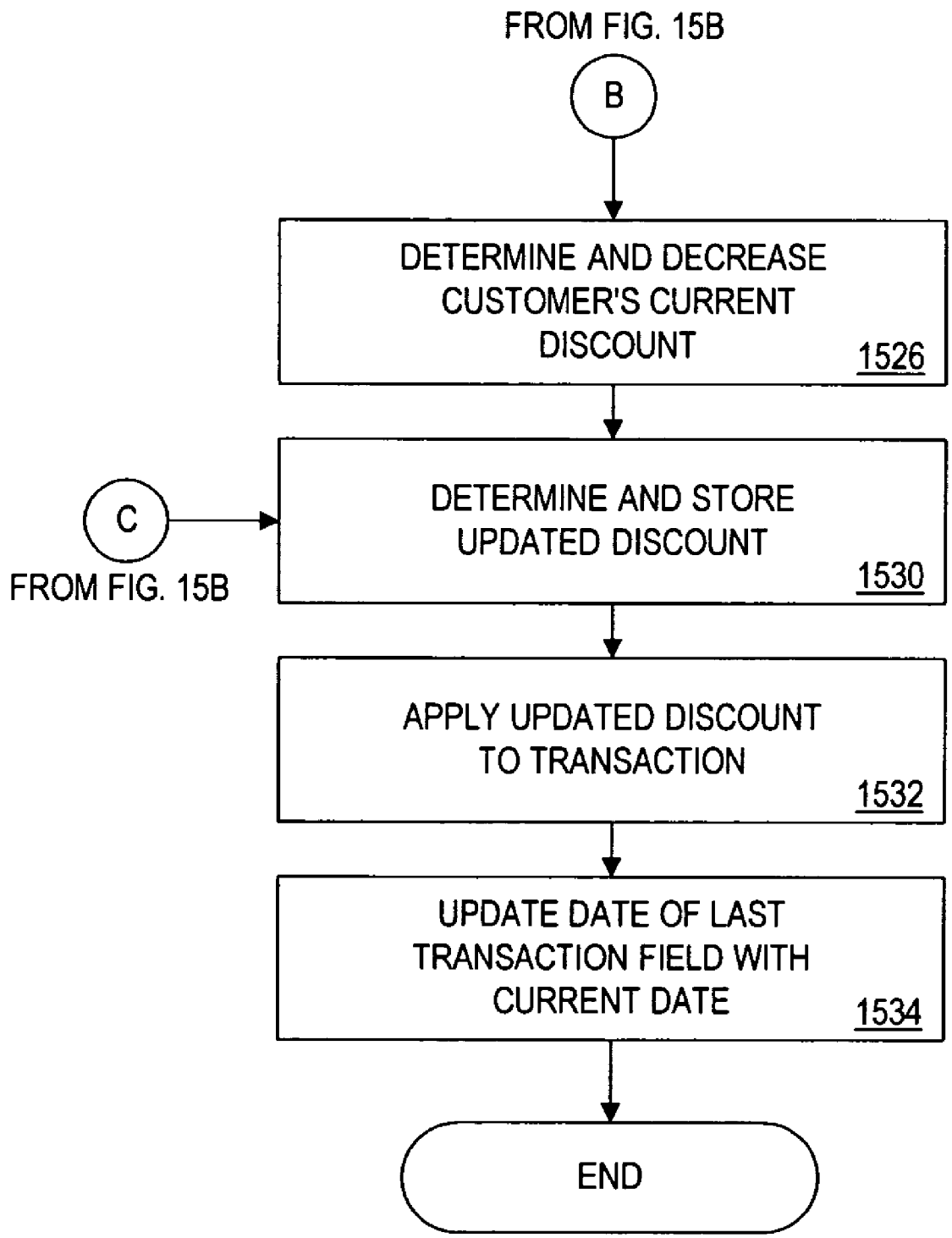

Referring now to FIG. 15, therein described is an alternate process 1500 for updating a discount, provided in accordance with the present invention. The process 1500 may be performed (i) by the POS controller 100 (FIG. 1), (ii) any of the POS terminals 110, 120, or 130 (FIG. 1), or (iii) any combination thereof. The process 1500 is performed at a time when a customer is present at a POS terminal 110, 120, or 130 (FIG. 1) and participating in a transaction. The process 1500 also includes a step of applying the updated discount to the customer's current transaction. In the embodiment of process 1500, the customer rating is determined for the customer at the time of the discount update (i.e. at the time of the transaction to which the discount is being applied), rather than being stored in the customer's record of the frequent shopper database 422 (FIG. 4). Thus, as described above, in the present invention the customer need not pre-register for a customer rating. The customer rating may be determined on a per-transaction basis, based on, for example, the customer's transaction price. Thus, the customer may qualify for a different discount increment or other benefits every time he participates in a transaction at the business employing the progressive discount system 10 (FIG. 1).

Process 1500 is initiated when the customer identifier is received in step 1502. As described above, the customer identifier may be received via (i) an input device of terminal 110, 120, or 130 (FIG. 1); or (ii) the license plate reader system 500 (FIG. 5). The transaction data associated with the customer identifier is then received in step 1504. As described above, this transaction data may include (i) the transaction price; (ii) the products included in the transaction, including product category identifiers; and (iii) the current date and time at which the transaction is occurring. The customer's record is then retrieved in step 1506 from the frequent shopper database 422 (FIG. 4) based on the customer identifier received in step 1502. The format of the frequent shopper database used in process 1500 is preferably similar to that of table 700 (FIG. 7), which contains the date of the customer's last transaction. The date of the customer's last transaction is determined in step 1508. This step may comprise retrieving the entry from the table 700 (FIG. 7). Alternately, the date of the customer's last transaction may be retrieved from the transaction database 1000. Such a transaction may be retrieved from the transaction database 1000 by querying the database 1000 for all records that contain the customer identifier of the customer participating in the current transaction and determining which record contains the most recent date.

Once the date of the customer's last transaction is determined, the progressive discount system 10 (FIG. 1) accesses the customer rating database in step 1510. The customer rating for the customer participating in the current transaction is then determined. For illustrative purposes, the three possible customer ratings described in the present invention are "A", "B", and "C". Those skilled in the art will realize that other customer ratings are possible.

The customer rating is determined by comparing the transaction data to the conditions associated with each of the possible customer ratings. Step 1512 comprises determining whether the time between the customer's last transaction and the date of the current transaction is greater than the time indicated by the transaction frequency requirement of the customer ratings. For simplicity it is assumed that each of the possible customer ratings has the same transaction frequency requirement (e.g., as in table 900 of FIG. 9A). If the transaction frequency requirement varies among the customer ratings, step 1512 may comprise determining whether the time between transactions is greater than the length of time indicated by each of the transaction frequency requirements.

If it is determined in step 1512 that the time between the customer's last transaction and the date of the current transaction is not greater than the predefined time period, process 1500 continues on to step 1514. The step 1514 comprises a determination of whether the current transaction price meets at least one of the transaction price requirements associated with the customer ratings. If the transaction price does meet one of the transaction price requirements, the associated customer rating of that requirement is determined in step 1516 and the associated discount increment is determined in step 1518.

The customer's current discount is then retrieved in step 1520, preferably from the customer's record retrieved in step 1506. The customer's current discount is only increased in step 1524 if, in step 1522, it is determined that the customer's current discount is less than the maximum allowable discount. The maximum allowable discount may be stored (i) in the program 420 (FIG. 4) of the POS controller, (ii) in the customer rating database 424 (FIG. 4), or (iii) elsewhere in the memory of progressive discount system 10 (FIG. 1). The customer's current discount is increased in step 1524 by the discount increment determined in step 1518.

Referring again to step 1512, if it is determined that the time between the customer's transactions is greater than the predefined time period, the process 1500 proceeds to step 1526 to determine and decrease the customer's current discount. The decrease may be by a set decrement that is stored in the program of progressive discount system 10 (FIG. 1) and may comprise setting the customer's current discount to zero (0%).

Referring again to step 1514, if it is determined that the current transaction price does not meet at least one of the transaction price requirements of the possible customer ratings, the process 1500 proceeds to step 1526. Step 1526 comprises determining the customer's current discount and decreasing it by a set amount, as described above. In other embodiments, the customer's current discount may not be adjusted if the current transaction does not meet at least one of the transaction price requirements. In other words, in such an alternate embodiment the customer is not penalized for not meeting one of the transaction price requirements if he at least participates in a transaction within the predefined time period.

Referring again to step 1522, if it is determined that the current discount is not less than the maximum allowable discount, the current discount is left unadjusted in step 1528. Thus, a customer that has already earned the maximum allowable discount will not be penalized by a decrease in his current discount if he still meets the conditions (i.e. the transaction frequency and transaction price requirements) of at least one of the customer ratings.

Once the current discount is (i) increased in step 1524, (ii) decreased in step 1526, or (iii) left unadjusted in step 1528, the updated discount is determined in step 1530. The updated discount is the discount resulting from the adjustment of the current discount. The updated discount is also stored in place of the current discount in step 1530. Thus, the updated discount will be the current discount at the next update of the customer's record. The updated discount is applied to the customer's transaction in step 1532. The step 1532 may comprise communicating the updated discount to the POS terminal at which the transaction is occurring. The current date is stored as the date of the customer's last transaction, for use at the customer's next transaction.

Figure 16:
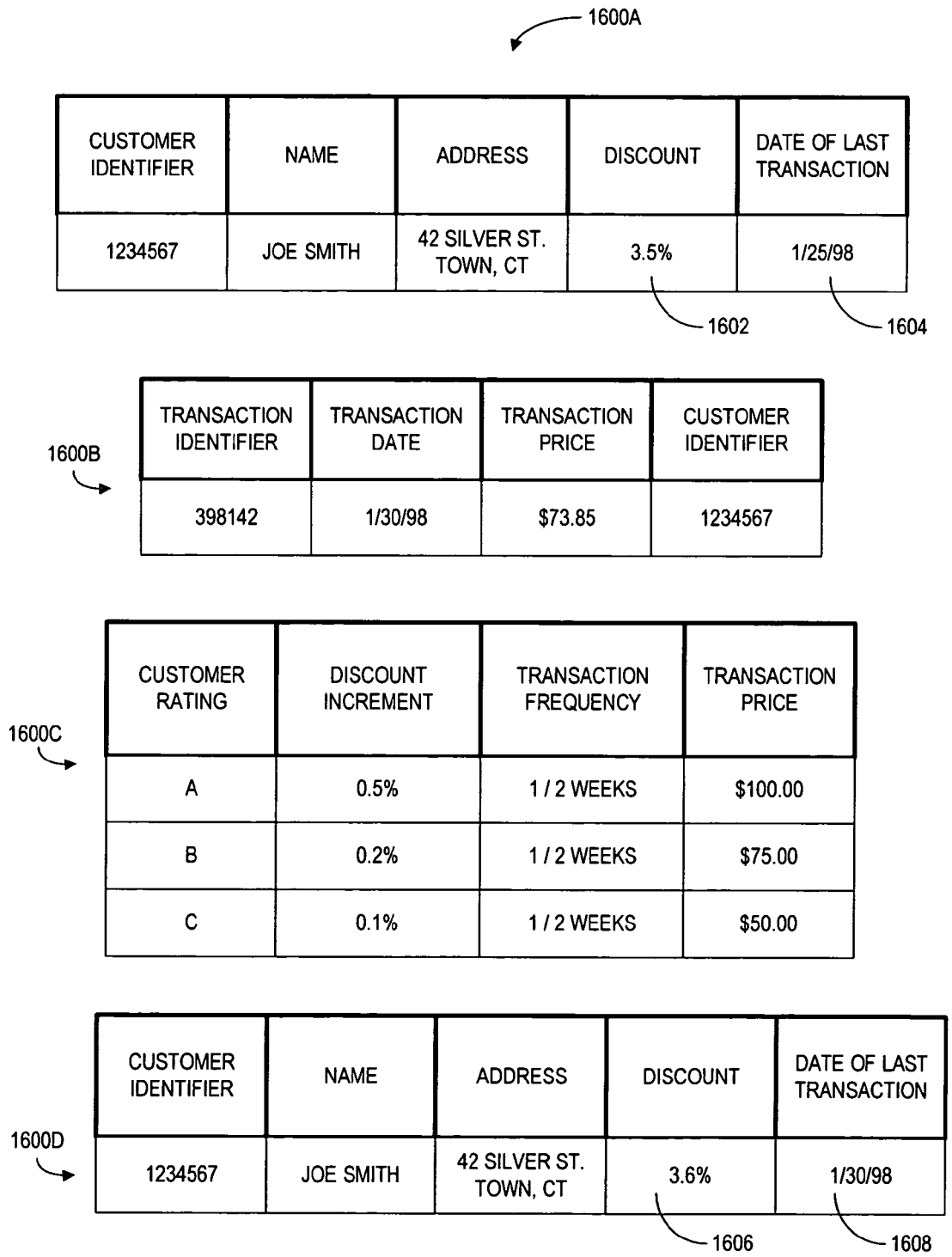
FIG. 16 is a schematic illustration of records of databases of the POS controller of FIG. 4, containing exemplary data.

Referring now to FIG. 16, therein depicted are exemplary data used in conjunction with the process 1500 for updating and applying a discount on a per transaction basis. The FIG. 16 utilizes entries from (i) the table 700 (FIG. 7) which illustrates an embodiment of the frequent shopper database 422 of FIG. 4, and (ii) the table 900 (FIG. 9A) which illustrates an embodiment of the customer rating database 424 of FIG. 4. For illustrative purposes, it will be assumed that the maximum allowable discount is 10.0% and that the grace period is equal to the time defined by the transaction frequency requirement of each customer rating.

FIG. 16 consists of entry 1600A, table 1600B, table 1600C, and entry 1600D. Entry 1600A is an entry from the table 700 (FIG. 7), showing a customer entry before a discount update. Entry 1600A includes data shown in entry 702 of FIG. 7. Figure numeral 1602 indicates the discount before the discount update. Figure numeral 1604 indicates the date of the customer's last transaction. Entry 1600B is a table indicating the pertinent transaction data of the transaction in which the customer is currently participating. Table 1600C is an illustration of table 900 (FIG. 9A). Table 1600C shows the benefit and conditions associated with each of the possible customer ratings. Entry 1600D is a version of entry 1600A after the discount update. Figure numeral 1606 indicates the updated discount, which resulted from utilizing the data in entry 1600A, table 1600B, and table 1600D to update the discount. Figure numeral 1608 indicates the update of the date of the customer's last transaction to reflect the current date.

Following the process 1500 (FIGS. 15A and 15B), the customer identifier "1234567" is received in accordance with step 1502. Table 1600B shows the transaction data that is received in accordance with step 1504. Entry 1600B shows that the current transaction is taking place on Jan. 30, 1998 and that the transaction price is $73.85. Entry 1600A shows the record of customer "1234567" that is retrieved from frequent shopper database 422 (FIG. 4) in accordance with step 1506. Entry 1600A shows that the date of the last transaction of customer "1234567", indicated by figure numeral 1604, is Jan. 25, 1998 (step 1508). Once the customer database is accessed in step 1510, table 1600C shows the discount increment benefit and conditions associated with each customer rating "A", "B", and "C".

In accordance with step 1512, it is determined that the time between the customer's transactions is not greater than the time indicated by the transaction frequency requirement of the table 1600C. Table 1600C shows that the transaction frequency requirement is at least one transaction per two week time period. The time between the customer's last transaction (Jan. 25, 1998) and the customer's current transaction (Jan. 30, 1998) is not greater than two weeks. The process 1500 thus proceeds to step 1514 in which it is determined that the current transaction price does meet at least one of the transaction price requirements of the customer rating database 424 (FIG. 4). Table 1600C shows that the customer rating "A" has an associated transaction price requirement of $100.00, the customer rating "B" has a $75.00 transaction price requirement, and the customer rating "C" has a $50.00 transaction price requirement. The transaction price of the current transaction, as shown in table 1600B, is $73.85. Thus, the current transaction qualifies customer "1234567" for a customer rating of "C" (step 1516). Table 1600C indicates that the discount increment associated with the customer rating "C" is 0.1% (step 1518).

The customer's current discount of 3.5%, as indicated by reference numeral 1602, is retrieved in accordance with step 1520. As described above, the maximum allowable discount is 10.0%. Since 3.5% is less than 10.0%, the process 1500 proceeds from step 1522 to step 1524. The customer's current discount is increased from 3.5% to 3.6% in accordance with step 1524. Thus, the updated discount is 3.6%. The updated discount of 3.6% is stored in the customer's record, in accordance with step 1530. The stored updated discount is shown in figure numeral 1606. Once the updated discount is applied to the customer's current transaction (step 1532), the current date is stored as the date of the customer's last transaction in accordance with step 1534. The updated date is indicated in figure numeral 1608. Thus, customer "1234567" has now earned a progressive discount of 3.6%.

Figure 17A:
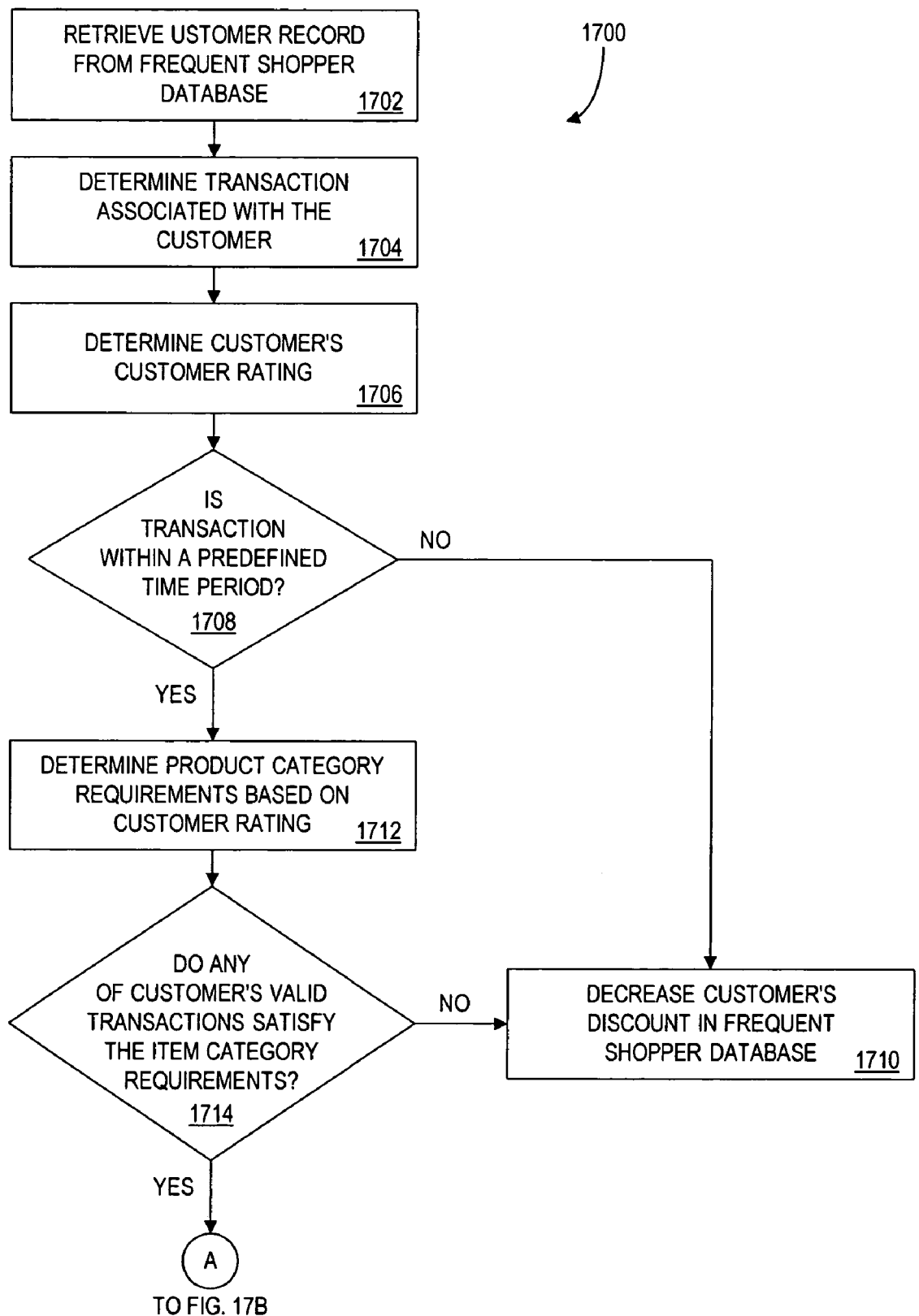
FIGS. 17A and 17B are flow charts illustrating an alternate method of updating a customer discount.
Figure 17B:
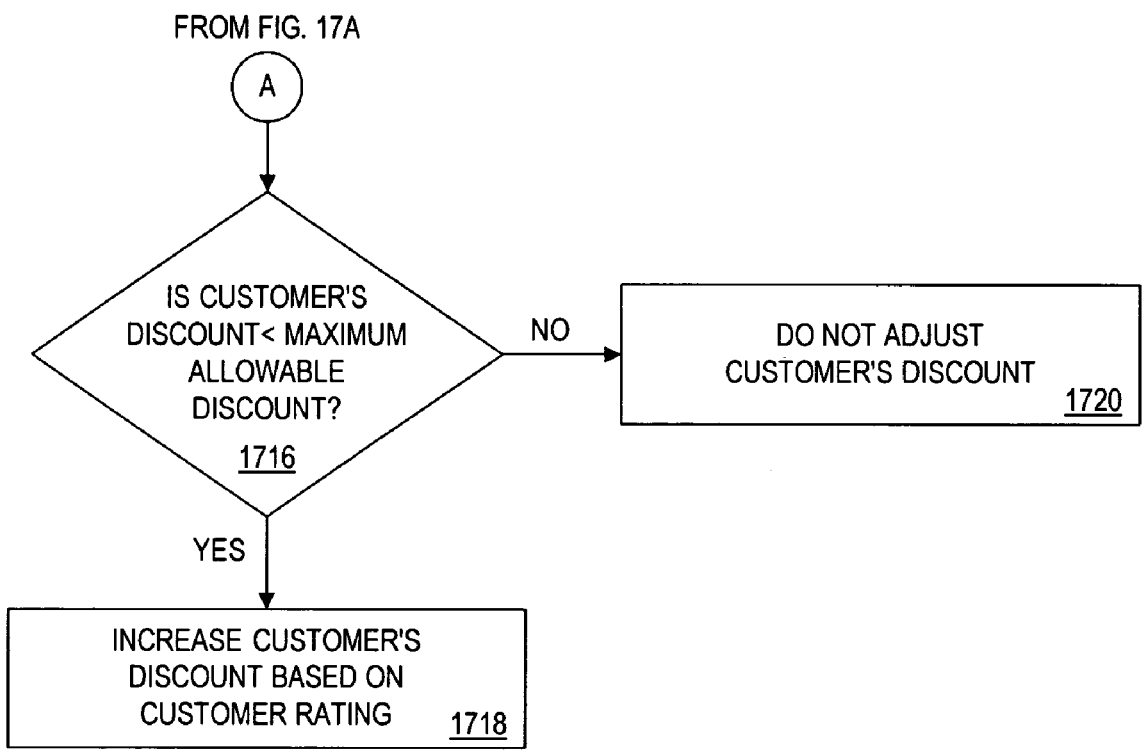

Referring now to FIGS. 17 and 17B, therein depicted is a process 1700 for updating a discount based on the products included in a transaction. The process 1700 may be performed by (i) the POS controller 100, (ii) any of the POS terminals 110, 120, or 130 (FIG. 1), or (iii) any combination thereof.

As described above, a condition of a customer rating may be that transactions include a specified number of products from predetermined product categories (e.g., high margin products). In other embodiments a similar, alternate condition may be that a predefined percentage of the transaction price is due to products from a specified product category. The table 960 (FIG. 9D) illustrates an embodiment of the customer rating database 424 (FIG. 4) in which different customer ratings require the purchase of a specified number of products within a predefined products category. For example, entry 962 of table 960 (FIG. 9D) shows that a customer rating "A" requires that a qualifying transaction include at least 5 category "Z" products. Entry 962 also shows that another condition of the customer rating "A" is that at least one such transaction occur at least once every two weeks.

Referring now to the steps of process 1700, the process initiates at step 1702 with the retrieval of a customer record from the frequent shopper database 422 (FIG. 4). In other embodiments the process 1700 may initiate when the customer identifier is received via (i) the input device of a POS terminal (FIG. 1), or (ii) the license plate reader system 500 (FIG. 5). The transaction data is then determined in step 1704. Step 1704 may comprise (i) receiving the transaction data from a POS terminal, or (ii) retrieving the transaction data from the transaction database 426 (FIG. 4). The transaction data includes (i) the product identifier of each of the products included in the transaction (e.g., as illustrated in field 1070 of FIG. 10), (ii) the product category identifier of each product included in the transaction (e.g., as illustrated in field 1075 of FIG. 10), and (iii) the date on which the transaction occurred (e.g., as illustrated in field 1040 of FIG. 10).

The customer rating of the customer participating in the transaction is determined in step 1706. The step 1706 may comprise (i) retrieving the customer rating from the customer's record, or (ii) determining the customer rating based on the transaction data.

The transaction data is evaluated in step 1708 in order to determine whether the transaction is within a predefined time period. The predefined time period is preferably one defined by the transaction frequency requirement of the customer rating that was determined in step 1706. If the transaction is not within the predefined time period, the customer's current discount (stored in the customer's record of the frequent shopper database 422 of FIG. 4) is decreased in step 1710. If the transaction is within the predefined time period, the process 1700 proceeds to step 1712.

The step 1712 comprises a determination of whether the products included in the customer's transaction meet the product category requirement of the customer rating determined in step 1706. This is accomplished by processing each of the product category identifiers that were included in the transaction data and determining whether they are of the category required by the customer rating. Step 1714 may further include determining whether the minimum number of products within the specified category are included in the transaction. If the product category identifiers meet the customer rating requirement, the process 1700 proceeds to step 1716.

The step 1716 comprises determining whether the customer's current discount (stored in the customer's record of the frequent shopper database 422) is less than the maximum allowable discount. If it is, the customer's current discount is increased in step 1718. The increment is preferably one stored in the customer rating database 424 (FIG. 4) in association with the customer rating. If the customer's current discount is not less than the maximum allowable discount (as determined in step 1716), the current discount is not adjusted (step 1720). Thus, once the customer has reached the maximum allowable discount, he retains that discount as long as he keeps meeting the customer rating requirements.

Referring again to step 1714, if it is determined that the product category identifiers contained in the transaction data do not meet the product category requirements of the customer rating, the process 1700 proceeds to step 1710. The step 1710 comprises decreasing the customer's current discount.

Figure 18:
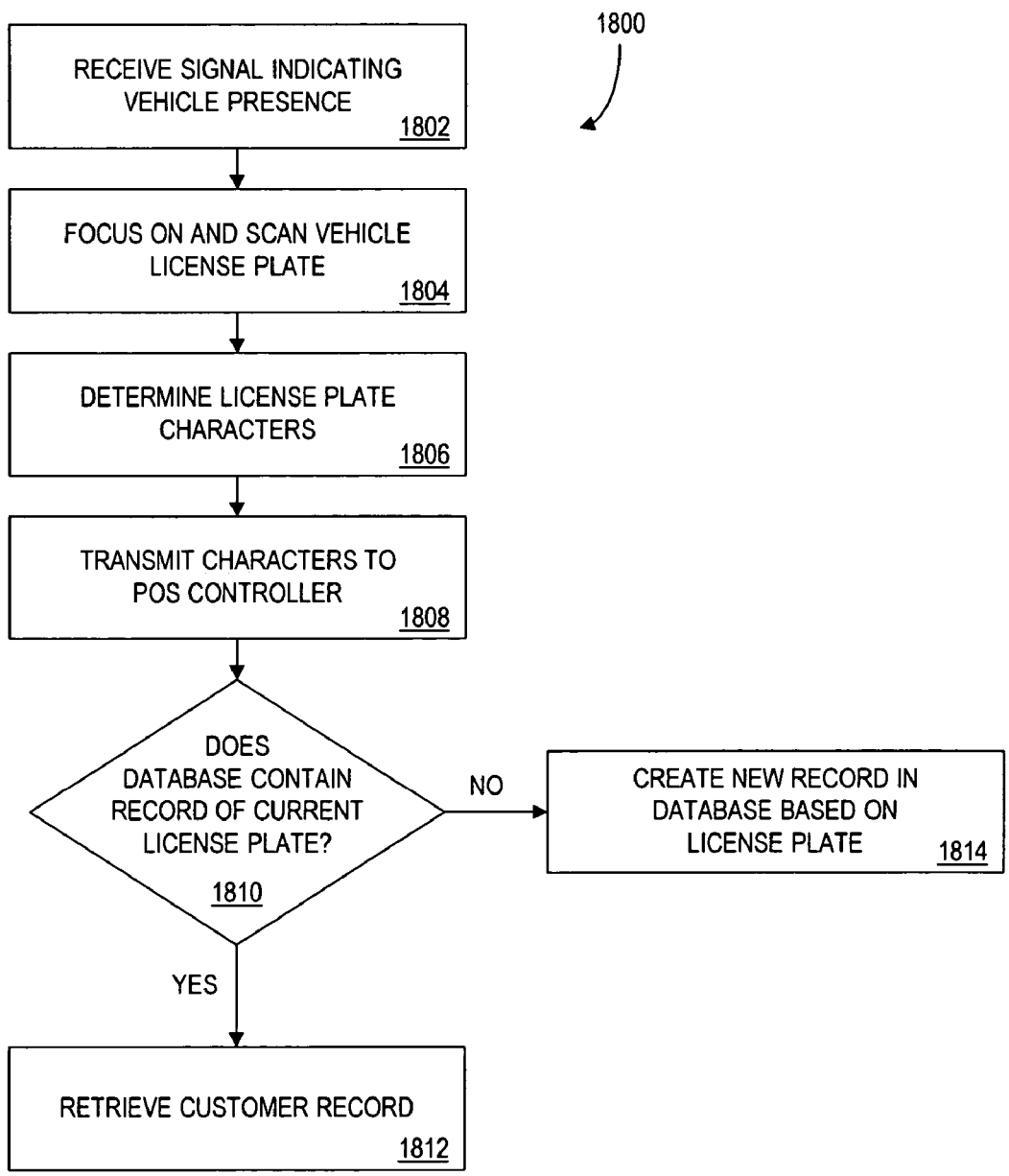
FIG. 18 is a flow chart illustrating an alternate method of receiving a customer identifier.

Referring now to FIG. 18, therein depicted is a process 1800. The process 1800 is an alternate method of updating a discount. The process 1800 describes the method of updating a discount utilizing the license plate reader system 500 (FIG. 5). Process 1800 is described with reference to elements of FIG. 5.

The process 1800 initiates with step 1802 when a signal is received indicating a vehicle's presence in roadway 512 (FIG. 5). The presence of a vehicle 530 indicates the occurrence of a transaction associated with the vehicle 530. The signal is preferably communicated from the sensors 505 and 510 to the processor 520 (FIG. 5). Once the signal indicating the presence of a vehicle is received, the processor 520 directs the image sampler 515 to scan the license plate 535 of the vehicle 530. The image sampler 515 scans the license plate 535 in step 1804 and transmits the license plate image to the processor 520. The processor 520 then proceeds to process the image in step 1806. As described above, the processor 520 may perform OCR on the image in order to determine the characters of the license plate 535.

Once the characters of the license plate 535 are determined by processor 520, the processor 520 transmits the characters to the POS controller 100 in step 1808. The POS controller 100 recognizes the characters as a customer identifier. The POS controller 100 queries the frequent shopper database 422 in order to determine whether a record containing the customer identifier already exists (step 1810). If the customer record does exist, it is retrieved in step 1812. The processor 100 utilizes the customer data in the record (e.g., the current discount and the customer rating) in conjunction with the transaction data associated with the vehicle 530 in order to determine and apply a discount. A discount may be determined and applied in accordance with any of the methods described above. If, in step 1810, it is determined that a customer record containing the determined customer identifier does not exist, a new record based on the customer identifier is opened in the frequent shopper database 422 (FIG. 4) in step 1814. Once the new customer record is opened, a discount may be determined and applied to the transaction associated with the customer identifier in accordance with any of the methods described above.

Although the present invention has been described with respect to a preferred embodiment thereof, those skilled in the art will note that various substitutions may be made to those embodiments described herein without departing from the spirit and scope of the present invention.

What is claimed is:

1. An apparatus comprising:
 a processor; and
 a storage device that stores a program for directing the processor,
 the processor being operative with the program to:
 receive transaction data that represents a transaction,
 receive an identifier that identifies a customer participating in the transaction,
 determine a customer rating of the customer,
 determine a grace period based on the customer rating,
 determine a time of the transaction,
 determine whether the time of the transaction is within the grace period,
 determine a second discount based on a first discount, the customer rating, and the time of the transaction, and
 apply the second discount to the transaction,
 wherein determining the second discount comprises:
 setting the second discount equal to the first discount if the time of the transaction is within the grace period.

2. An apparatus comprising:
 a processor; and
 a storage device that stores a program for directing the processor,
 the processor being operative with the program to:
 receive transaction data that represents a transaction,
 receive an identifier that identifies a customer participating in the transaction,
 determine a customer rating of the customer,
 determine a grace period based on the customer rating,
 determine a time of the transaction,
 determine whether the time of the transaction is within the grace period,
 determine a second discount based on a first discount, the customer rating, and the time of the transaction, and
 apply the second discount to the transaction,
 wherein determining the second discount comprises:
 setting the second discount less than the first discount if the time of the transaction is not within the grace period.

3. An apparatus comprising:
 a processor; and
 a storage device that stores a program for directing the processor,
 the processor being operative with the program to:
 receive transaction data that represents a transaction,
 receive an identifier that identifies a customer participating in the transaction,
 determine a customer rating of the customer,
 determine a time of the transaction,
 determine a second discount based on a first discount, the customer rating, and the time of the transaction, and
 apply the second discount to the transaction,
 wherein determining the second discount comprises:
 determining a discount increment based on:
 the customer rating, and
 the time of the transaction; and
 determining the second discount, at a time when the customer is present at a point-of-sale terminal and participating in the transaction, based on the first discount and the discount increment;
 and wherein applying comprises:
 applying the second discount to the transaction when the customer is present at the point-of-sale terminal and participating in the transaction.

4. An apparatus comprising:
 a processor; and
 a storage device that stores a program for directing the processor,
 the processor being operative with the program to:
 receive transaction data that represents a transaction,
 receive an identifier that identifies a customer participating in the transaction,
 determine a customer rating of the customer,
 determine a time of the transaction, determine a second discount based on a first discount, the customer rating, and the time of the transaction, and apply the second discount to the transaction, wherein determining the second discount comprises:

determining a discount decrement based on:

the customer rating, and the time of the transaction; and determining the second discount, at a time when the customer is present at a point-of-sale terminal and participating in the transaction, based on the first discount and the discount decrement;

and wherein applying comprises:

applying the second discount to the transaction when the customer is present at the point-of-sale terminal and participating in the transaction.

5. A computer readable medium encoded with instructions for directing a processor to:

receive transaction data that represents a transaction;

receive an identifier that identifies a customer participating in the transaction;

determine a customer rating of the customer;

determine a grace period based on the customer rating;

determine a time of the transaction;

determine whether the time of the transaction is within the grace period;

determine a second discount based on a first discount, the customer rating, and the time of the transaction; and apply the second discount to the transaction, wherein determining the second discount comprises:

setting the second discount equal to the first discount if the time of the transaction is within the grace period.

6. A computer readable medium encoded with instructions for directing a processor to:

receive transaction data that represents a transaction;

receive an identifier that identifies a customer participating in the transaction;

determine a customer rating of the customer;

determine a grace period based on the customer rating;

determine a time of the transaction;

determine whether the time of the transaction is within the grace period;

determine a second discount based on a first discount, the customer rating, and the time of the transaction; and apply the second discount to the transaction, wherein determining the second discount comprises:

setting the second discount less than the first discount if the time of the transaction is not within the grace period.

7. A computer readable medium encoded with instructions for directing a processor to:

receive transaction data that represents a transaction, receive an identifier that identifies a customer participating in the transaction, determine a customer rating of the customer, determine a time of the transaction, determine a second discount based on a first discount, the customer rating, and the time of the transaction, and apply the second discount to the transaction, wherein determining the second discount comprises:

determining a discount increment based on:

the customer rating, and the time of the transaction; and determining the second discount, at a time when the customer is present at a point-of-sale terminal and participating in the transaction, based on the first discount and the discount increment;

and wherein applying comprises:

applying the second discount to the transaction when the customer is present at the point-of-sale terminal and participating in the transaction.

8. A computer readable medium encoded with instructions for directing a processor to:

receive transaction data that represents a transaction, receive an identifier that identifies a customer participating in the transaction, determine a customer rating of the customer, determine a time of the transaction, determine a second discount based on a first discount, the customer rating, and the time of the transaction, and apply the second discount to the transaction, wherein determining the second discount comprises:

determining a discount decrement based on:

the customer rating, and the time of the transaction; and determining the second discount, at a time when the customer is present at a point-of-sale terminal and participating in the transaction, based on the first discount and the discount decrement;

and wherein applying comprises:

applying the second discount to the transaction when the customer is present at the point-of-sale terminal and participating in the transaction.

* * * * *